(12) United States Patent
Kojima

(10) Patent No.: US 7,264,231 B2
(45) Date of Patent: Sep. 4, 2007

(54) DIFFUSED GAS AERATION APPARATUS

(75) Inventor: Hisao Kojima, Kanagawa (JP)

(73) Assignee: Anemos Company Ltd., Tokyo (JP)

( * ) Notice: Subject to any disclaimer, the term of this patent is extended or adjusted under 35 U.S.C. 154(b) by 62 days.

(21) Appl. No.: 11/075,138

(22) Filed: Mar. 8, 2005

(65) Prior Publication Data
US 2005/0263914 A1 Dec. 1, 2005

Related U.S. Application Data

(63) Continuation-in-part of application No. PCT/JP03/13844, filed on Oct. 29, 2003.

(51) Int. Cl.
B01F 3/04 (2006.01)
(52) U.S. Cl. .................. 261/79.2; 261/121.1; 261/123
(58) Field of Classification Search ............... 261/79.2, 261/121.1, 123, 126, DIG. 70
See application file for complete search history.

(56) References Cited

U.S. PATENT DOCUMENTS

| 3,852,384 | A | * | 12/1974 | Bearden | 261/77 |
| 4,098,582 | A | * | 7/1978 | Takeda | 23/293 R |
| 4,421,725 | A | * | 12/1983 | Dezael et al. | 423/228 |
| 5,945,039 | A | * | 8/1999 | Kojima | 261/36.1 |
| 6,032,931 | A | * | 3/2000 | Plunkett | 261/77 |
| 6,431,528 | B1 | * | 8/2002 | Kojima | 261/79.2 |
| 6,860,473 | B2 | * | 3/2005 | Oshima | 261/79.2 |

FOREIGN PATENT DOCUMENTS

| GB | 2 063 694 A | * | 6/1981 |
| JP | S44-8290 | | 4/1969 |
| JP | 53-036182 | | 4/1978 |
| JP | 59-206096 | | 11/1984 |
| JP | 02-198694 | | 8/1990 |
| JP | 5-015753 | | 1/1993 |
| JP | 05-168882 | | 7/1993 |
| JP | 07-284642 | | 10/1995 |
| JP | 07-308536 | | 11/1995 |
| JP | 09-000865 | | 1/1997 |
| JP | 10-080627 | | 3/1998 |
| JP | 10-085721 | | 4/1998 |
| JP | 2001-062269 | | 3/2001 |
| JP | 2001-269692 | | 10/2001 |
| JP | 2002-143834 | | 5/2002 |

OTHER PUBLICATIONS

Chen, et al., "Static Mixing Handbook"; Chemical Research Institute, 1973.
Matsummura et al., "Static Mixer-Fundamentals and Applications", Nikkan Kogyo Shimbun, Ltd., 1981.

* cited by examiner

Primary Examiner—Scott Bushey
(74) Attorney, Agent, or Firm—Sonnenschein Nath & Rosenthal LLP

(57) ABSTRACT

An aeration apparatus including a cylindrical passage tube, a static mixer positioned in the passage tube adjacent an upper end of the tube and including a plurality of perforated blades and an opening between the blades along a central axis of the tube, a pneumatic line extending to the passage tube and connectable to a gas source, a gas blowoff portion positioned adjacent a lower end of the passage tube and connected to the pneumatic line for supplying gas from the gas source to the passage tube, and a liquid-introducing portion adjacent the lower end of the passage tube.

18 Claims, 19 Drawing Sheets

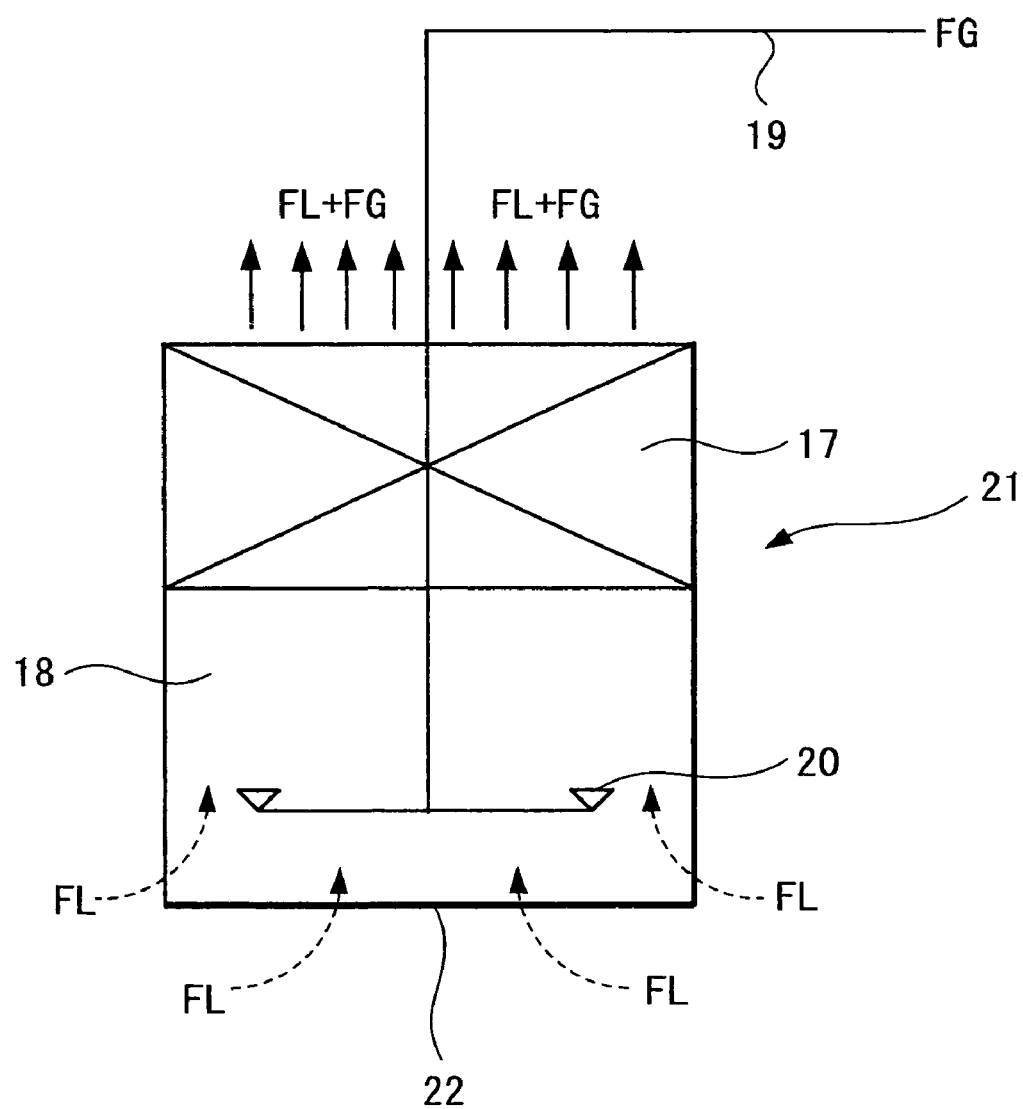

FG

PRIOR ART

PRIOR ART

DIFFUSED GAS AERATION APPARATUS

RELATED APPLICATIONS

This application is a continuation-in-part of International Patent Application No. PCT/JP03/13844, filed Oct. 29, 2003, incorporated herein for all purposes by reference to the extent permitted by law.

The present invention relates to a diffused gas aeration apparatus used for: water treatment and water purification of industrial effluent, supplied water and sewage, lakes and marshes, rivers, groundwater, and so on; removing and collecting foreign substances in gas; and a bioreactor or the like. Specifically, the present invention relates to an operation to mix and agitate gas and liquid to make a gas-liquid contact, and relates to a diffused gas aeration apparatus used for: dissolving oxygen in the air in water by aerating air in the water; diffusing a volatile substance such as ammonia, trichloroethane, methylene chloride, chlorine or trihalomethane that remains dissolved in water; removing and collecting a foreign substance in gas such as hydrogen chloride, sulfur dioxide or dust by means of reaction absorption and trapping; and further, enzymatic reaction, micro-organic reaction, and so on.

Conventional diffused gas aeration apparatuses can be classified broadly into those of an air-diffusing method (bubble) and those of a mechanical agitation method (surface agitation). As shown in FIG. 16, regarding an aeration processing apparatus 110 by means of the air-diffusing system in particular, a large number of panel diffusers 112, diffuser pipes and the like are disposed on the bottom of an aeration tank 111, and pressurized air is supplied thereto through an air blower 113 and a pneumatic dispatch line 114 to execute aeration processing. Further, when a nitrogen compound such as ammonia which remains dissolved in liquid is diffused and then cleaned and collected, a packed column, a plate column or the like is frequently used as shown in FIG. 17. In the case of a diffusion processing apparatus 115 of the packed column method, liquid is supplied from the upper part of a packed column 116, and gas is supplied from the lower part of the column. While gas-liquid contact takes place by a countercurrent through packing 117 placed inside the column, a volatile substance such as ammonia ($NH_4^+$), organic solvent, etc. in the liquid is diffused toward the gas side, so that the cleaning and collecting of the liquid are executed.

Further, as a gas-liquid contact reactor for an apparatus of processing exhaust gas which contains dust and sulfurous acid gas, a cylindrical exhaust gas diffuser pipe with a number of gas blowoff holes is used. An exhaust gas treating method which uses this exhaust gas diffuser pipe is disclosed in Japanese Published Patent Application No. H7-308536 and Japanese Published Patent Application No. H9-865; however, gas-liquid contact efficiency between liquid and bubbles which pour out of a number of gas blowoff holes is low. In addition, there is a problem of blockage caused by the accretionary growth of calcium sulfate, which is a reaction product.

Further, regarding a diffused gas aeration apparatus using a conventional static mixer, oxygen absorption efficiency is low due to structural reasons; also, it is difficult to manufacture a diffused gas aeration apparatus with a wide bore (500 mm or more in diameter), and even if possible, gas-liquid contact efficiency will be low. Further, the cost of production will be high.

Furthermore, the bore diameter of an air blowoff hole of an air-supplying pneumatic dispatch tube that is disposed in the lower part of a conventional static mixer is in the range of 10 to 40 mm. One or more blowoff holes are provided on the upper surface of this pneumatic dispatch tube.

Since the diameter of each bubble supplied from the blowoff holes is large, gas-liquid contact efficiency is low and contact time is long.

As a result, the total length of a static mixer becomes long, and apparatus cost becomes high.

SUMMARY OF THE INVENTION

Problems to be solved by the Invention

A conventional diffused gas aeration apparatus requires a large area, because oxygen dissolving efficiency and gas absorption efficiency are low. Further, more air than necessary that contains oxygen is pressurized and supplied to panel diffusers and the like to execute mixture and agitation in an aeration tank. Thus, a great deal of electric power is consumed. Also, a conventional diffusion processing apparatus such as a packed column or a plate column requires periodic maintenance, because a calcium compound, micro-organisms and the like in liquid adhere to packing, plates, etc. and grow, causing clogging. Further, a diffused gas aeration apparatus using a conventional static mixer has been low in oxygen absorption efficiency and it is difficult to increase in size. Accordingly, the present invention aims at providing a diffused gas aeration apparatus in which effluent and the like are purified and also foreign substances in gas are removed and collected with improving gas-liquid contact efficiency, and executing aeration, diffusion and reaction treatment extremely effectively, in an energy-saving and space-saving manner, at low cost and without the need for maintenance. Further, the present invention aims at providing a bioreactor capable of being used for highly efficient enzymatic reaction and micro-organic reaction.

Means for Solving the Problems

A first diffused gas aeration apparatus of the present invention for solving the above-described problems is a diffused gas aeration apparatus including: a cylindrical passage tube substantially disposed vertically in which fluid passes in the longitudinal direction and in which a static mixer is provided, and a gas blowoff portion disposed on the lower end side of the passage tube, which gushes and supplies gas to the inside of the passage tube through a pneumatic dispatch line and in which a spray nozzle is provided; wherein gas is supplied to the gas blowoff portion of the pneumatic dispatch tube, liquid is introduced into the passage tube from the lower side of the passage tube, the gas and liquid flow upward in a parallel direction in the passage tube, and the gas and liquid come to gas-liquid contact inside the passage tube to be discharged into liquid from the upper end side of the passage tube. In such diffused gas aeration apparatus is disposed a static mixer which mixes and agitates fluid utilizing the flow energy of fluid requiring no mixture agitation power and is disposed a gas blowoff portion below the static mixer; and liquid is introduced from under the gas blowoff portion by means of the gushing energy. The gas and liquid flow in a parallel direction through the passage tube from the lower end side to the upper end side to be in gas-liquid contact and mixture, and then aeration, diffusion and reaction treatment are executed.

Further, a second diffused gas aeration apparatus of the present invention for solving the above-described problems is a diffused gas aeration apparatus including: a cylindrical passage tube substantially disposed vertically in which fluid passes in the longitudinal direction and in which a static mixer is provided, and a gas blowoff portion disposed on the lower part of the passage tube, which gushes and supplies gas to the inside of the passage tube and in which a static mixer is provided; wherein gas is supplied to the gas blowoff portion, liquid is introduced into the passage tube from the lower side of the passage tube, the gas and liquid flow upward in a parallel direction in the passage tube, and the gas and liquid come to gas-liquid contact and mixture inside the passage tube to be discharged from the upper end side of the passage tube into liquid.

Further, each of the static mixers disposed in the passage tube and disposed in the gas blowoff portion has a plurality of spiral blades which are either right twisted or left twisted to form a plurality of fluid passages, and the fluid passages are joined through an opening of blades in the longitudinal direction to each other, and the blades are formed of perforated boards.

EFFECT OF THE INVENTION

According to the diffused gas aeration apparatus of the present invention, power consumption can be reduced considerably, because gas-liquid contact efficiency is improved. Further, time required for aeration, diffusion and reaction treatment is reduced by improving gas-liquid contact efficiency. Furthermore, since gas-supplying ability is improved by the unit area with respect to the diffused gas aeration apparatus, a large area in the horizontal direction is not required for installation, leading to saving the space and to reducing construction engineering costs and apparatus costs to be low. Further, the construction cost of air-supplying pipes or the like is lowered. Moreover, no shutdown of operation owing to clogging arises, so that maintenance costs and manufacturing management costs become low. Further, since no stagnant part (dead space) of fluid exists, enlargement of the apparatus is facilitated.

BRIEF DESCRIPTION OF DRAWINGS

FIG. 3 is a pattern diagram showing a third embodiment of the present invention;

FIGS. 4A and 4B are views showing an embodiment of a static mixer used in the present invention, in which FIG. 4A is a schematic perspective view of a passage tube with right twisted spiral blades and similarly FIG. 4B is a schematic perspective view of a passage tube with left twisted spiral blades;

DETAILED DESCRIPTION OF THE PRESENTLY PREFERRED EMBODIMENTS

Figure 1:
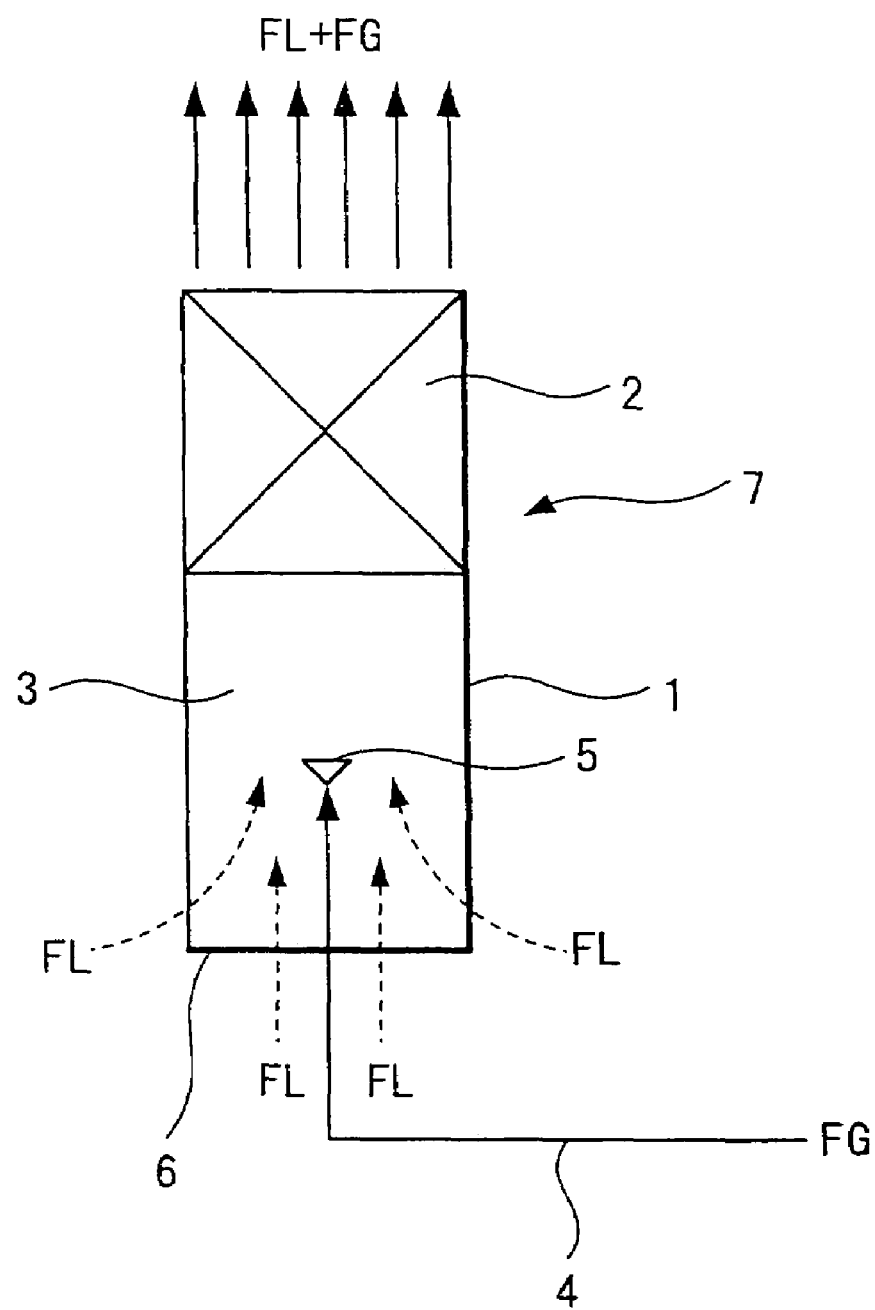
FIG. 1 is a pattern diagram showing a first embodiment of the present invention.
Figure 2:
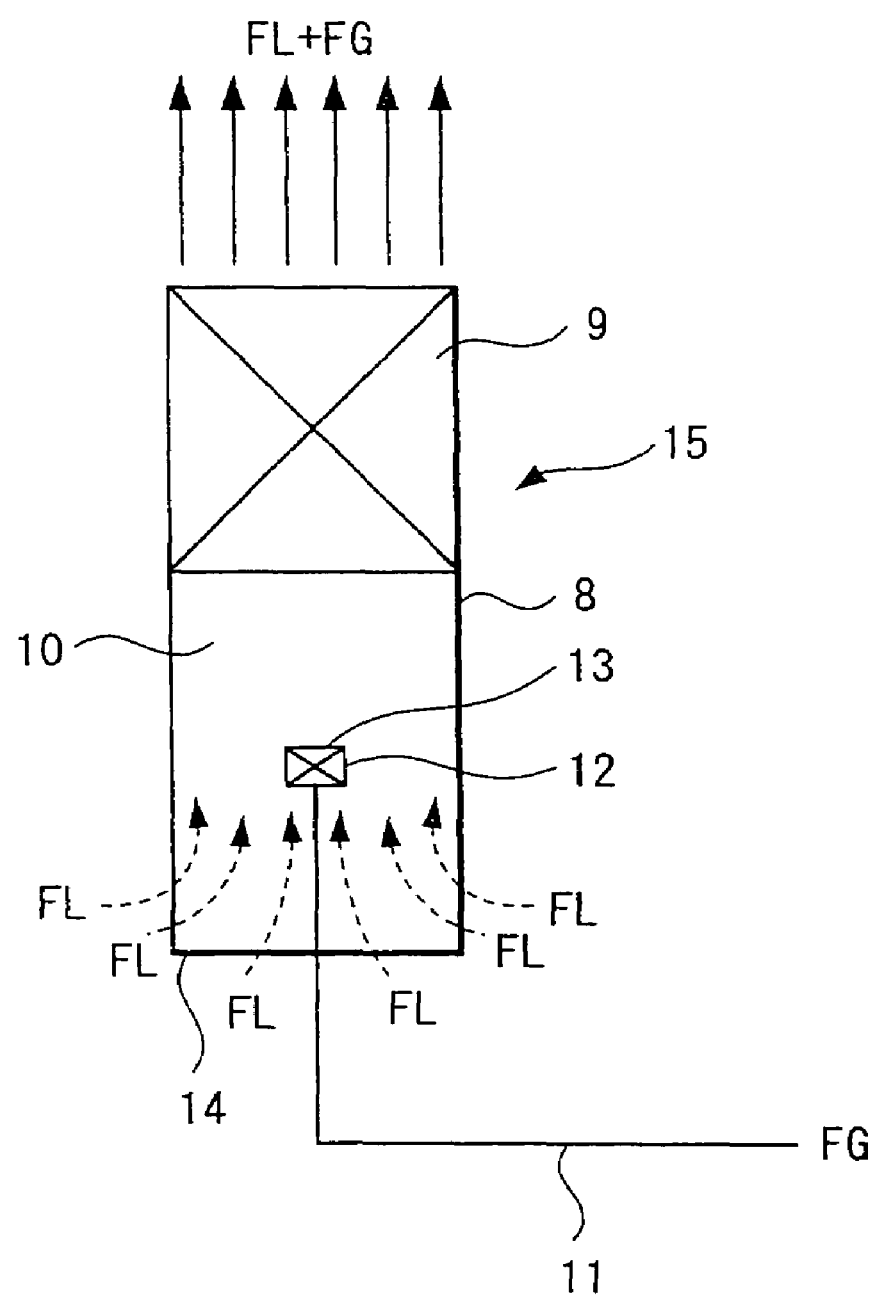
FIG. 2 is a pattern diagram showing a second embodiment of the present invention.
Figure 4A:
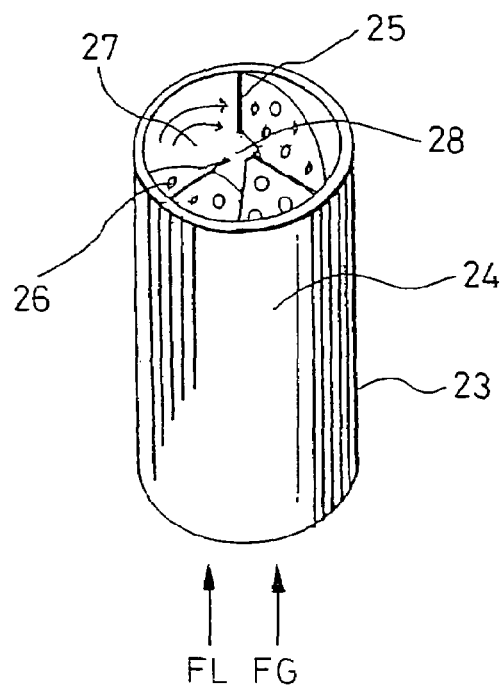
Figure 4B:
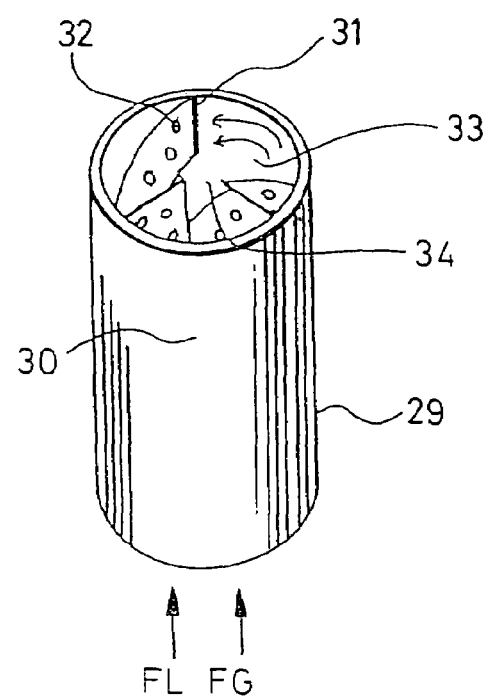
Figure 5:
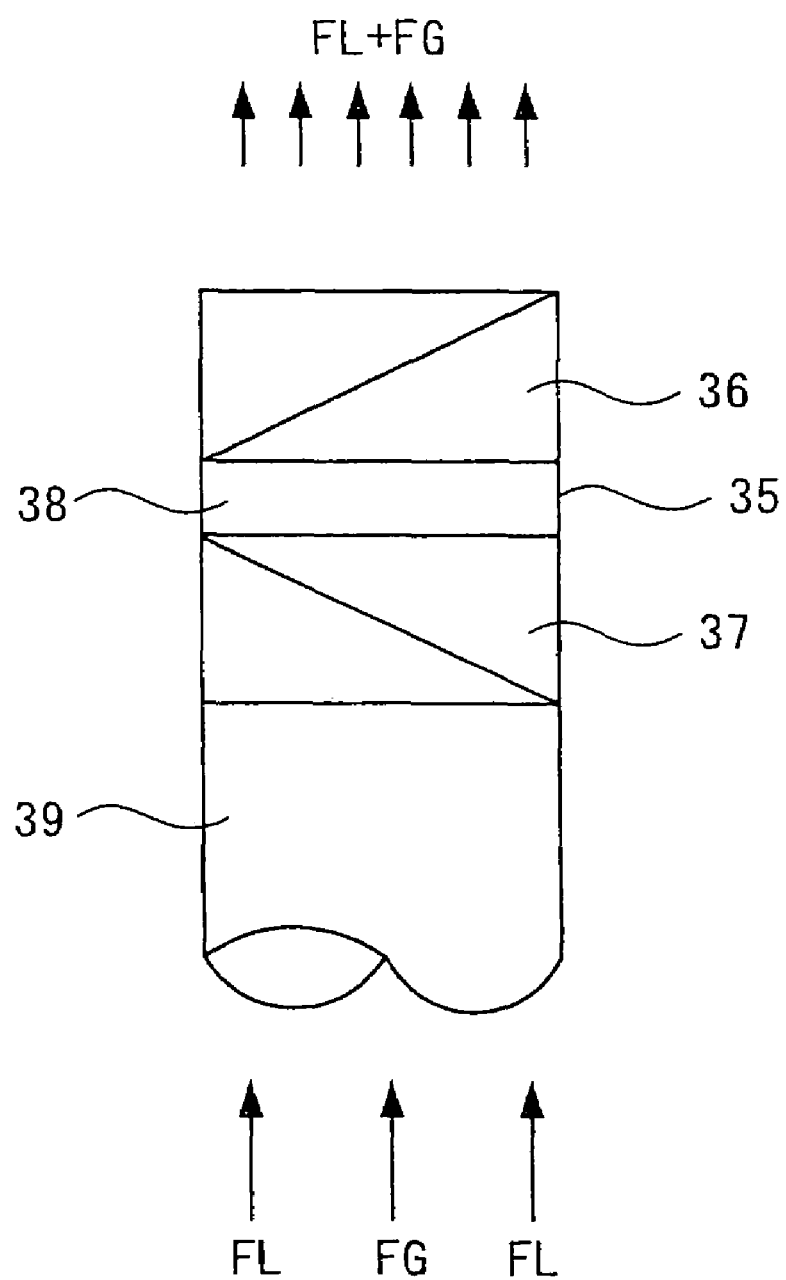
FIG. 5 is a basic constitutional diagram showing an embodiment of a static mixer used in the present invention.
Figure 6:
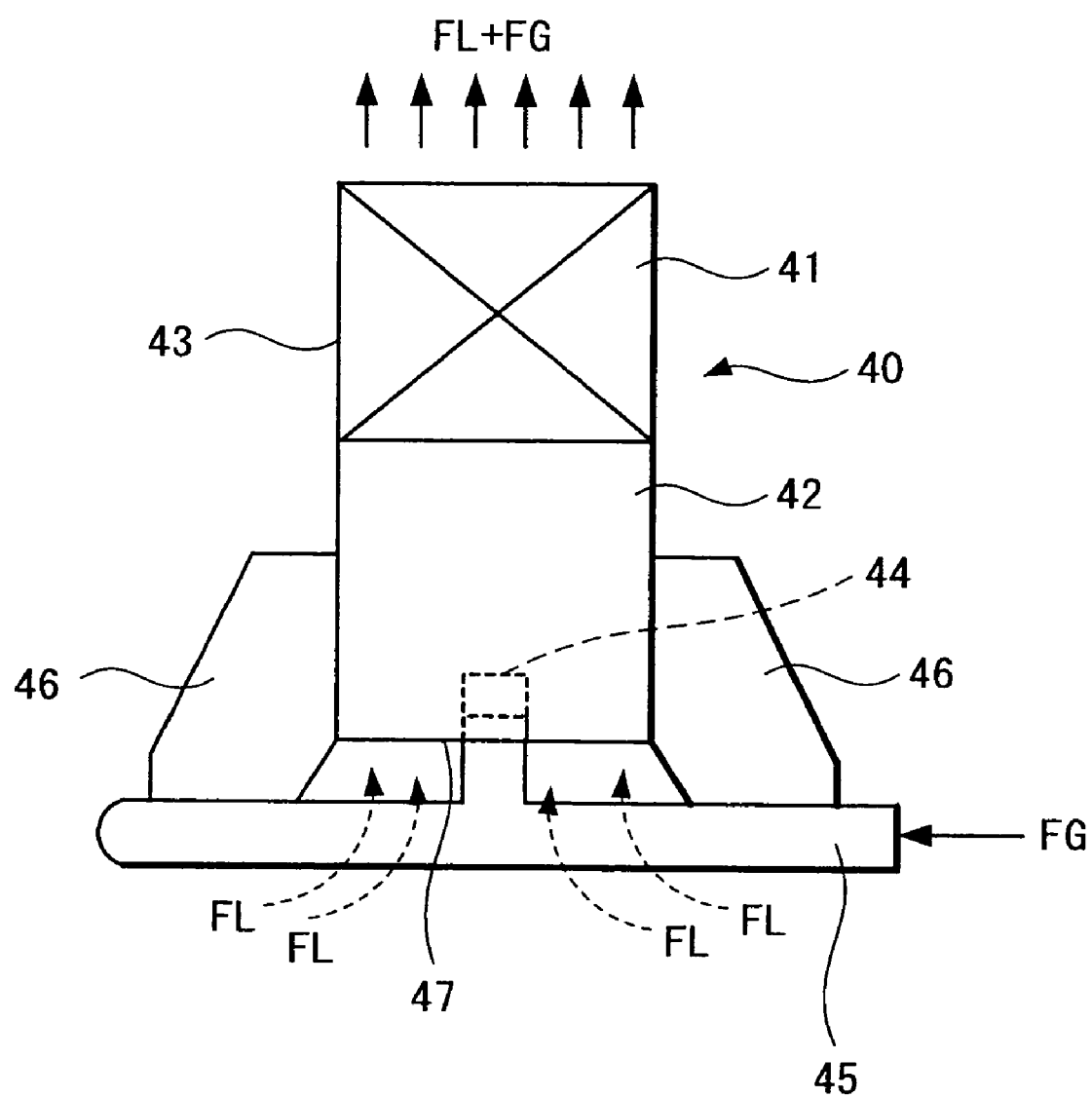
FIG. 6 is a schematic diagram showing a diffused gas aeration apparatus according to a first embodiment of the present invention.
Figure 7:
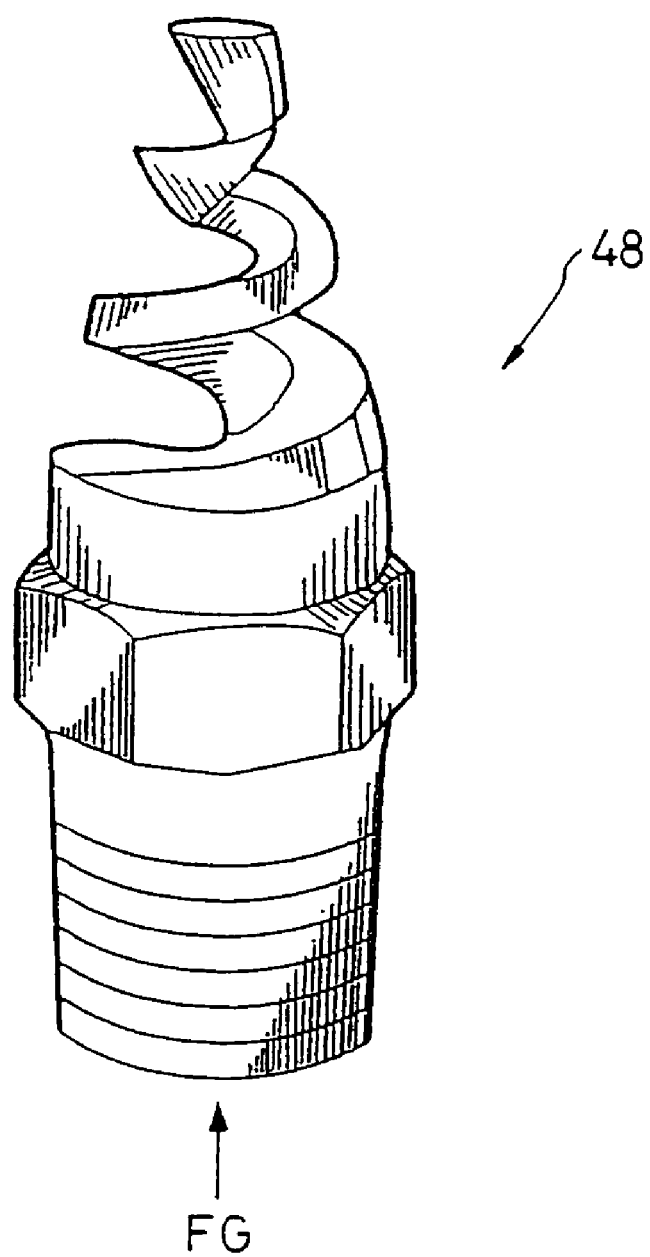
FIG. 7 is a perspective view showing an embodiment of a spray nozzle used in the first embodiment of the present invention.
Figure 8:
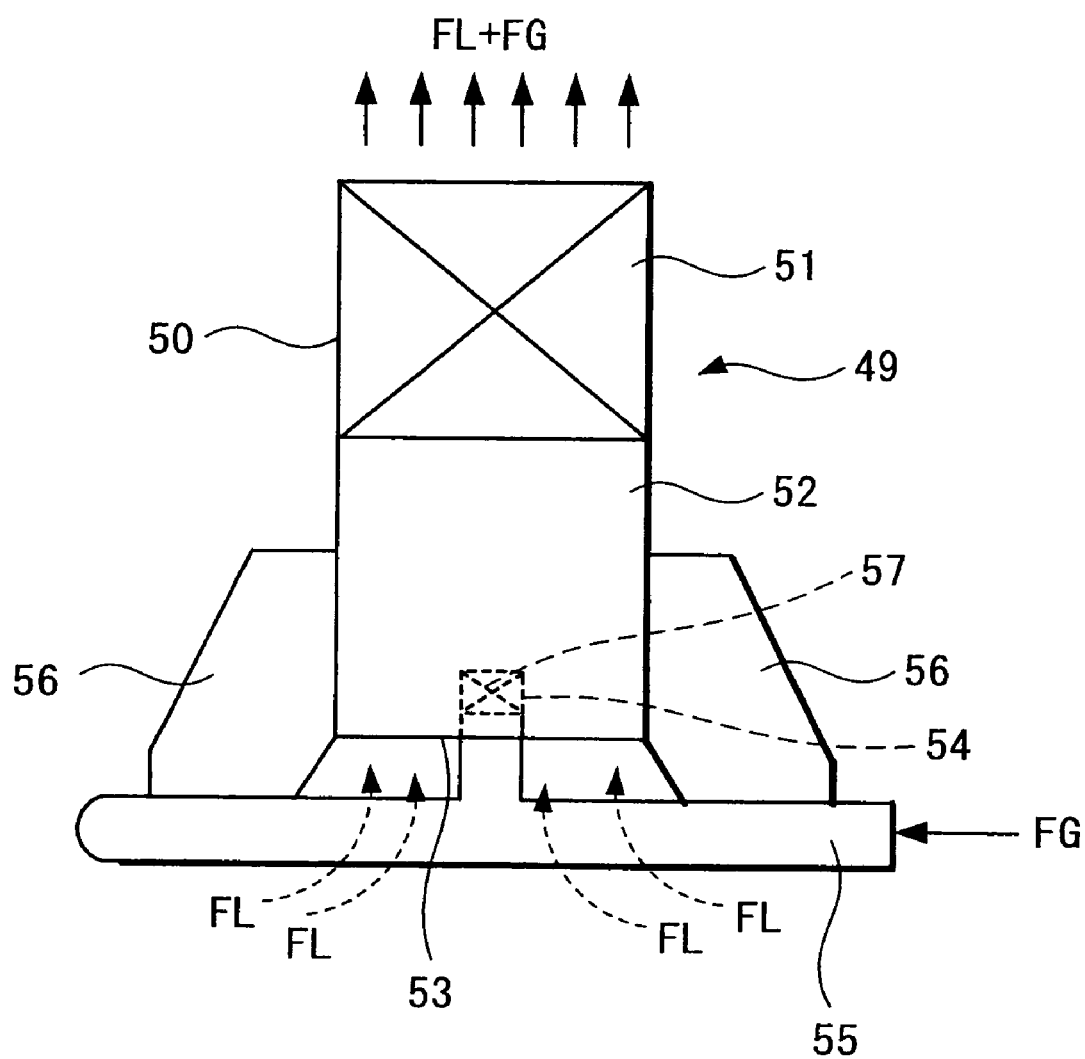
FIG. 8 is a schematic diagram of a diffused gas aeration apparatus according to a second embodiment of the present invention.
Figure 9:
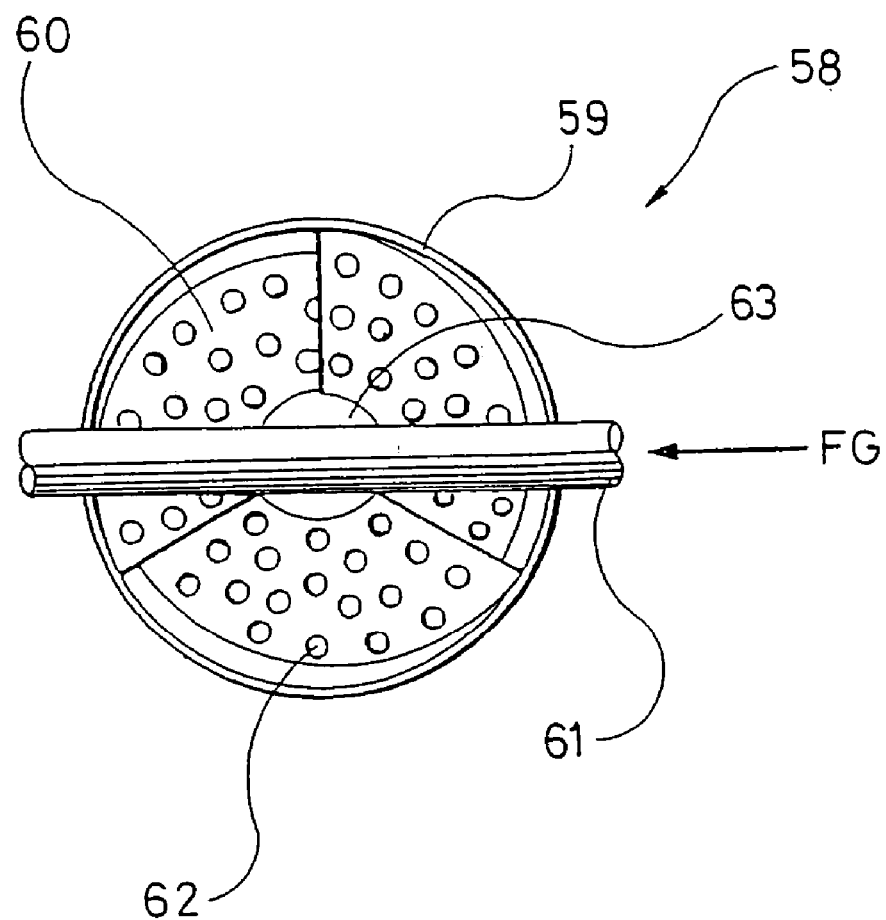
FIG. 9 is a partly schematic bottom view of a diffused gas aeration apparatus according to the second embodiment of the present invention.
Figure 10:
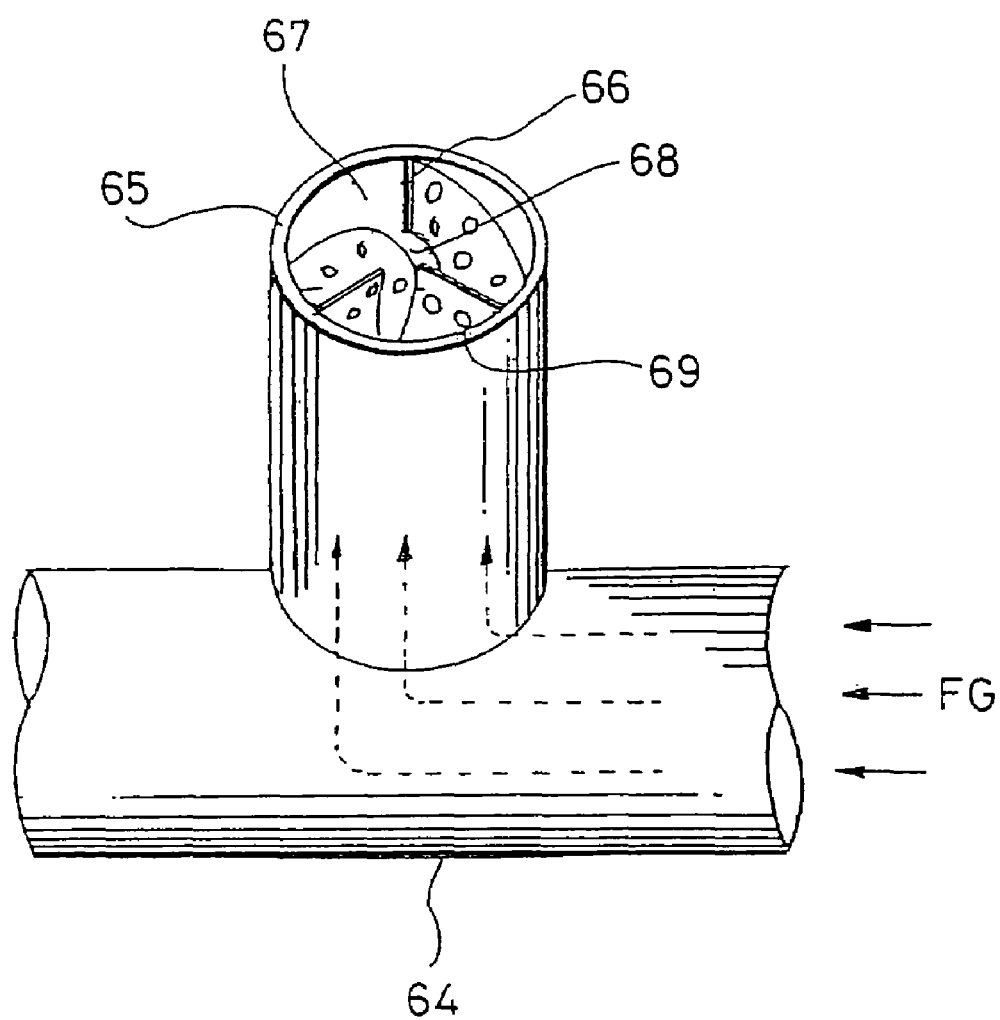
FIG. 10 is a partly schematic perspective view of a gas blowoff portion according to the second embodiment of the present invention.
Figure 11:
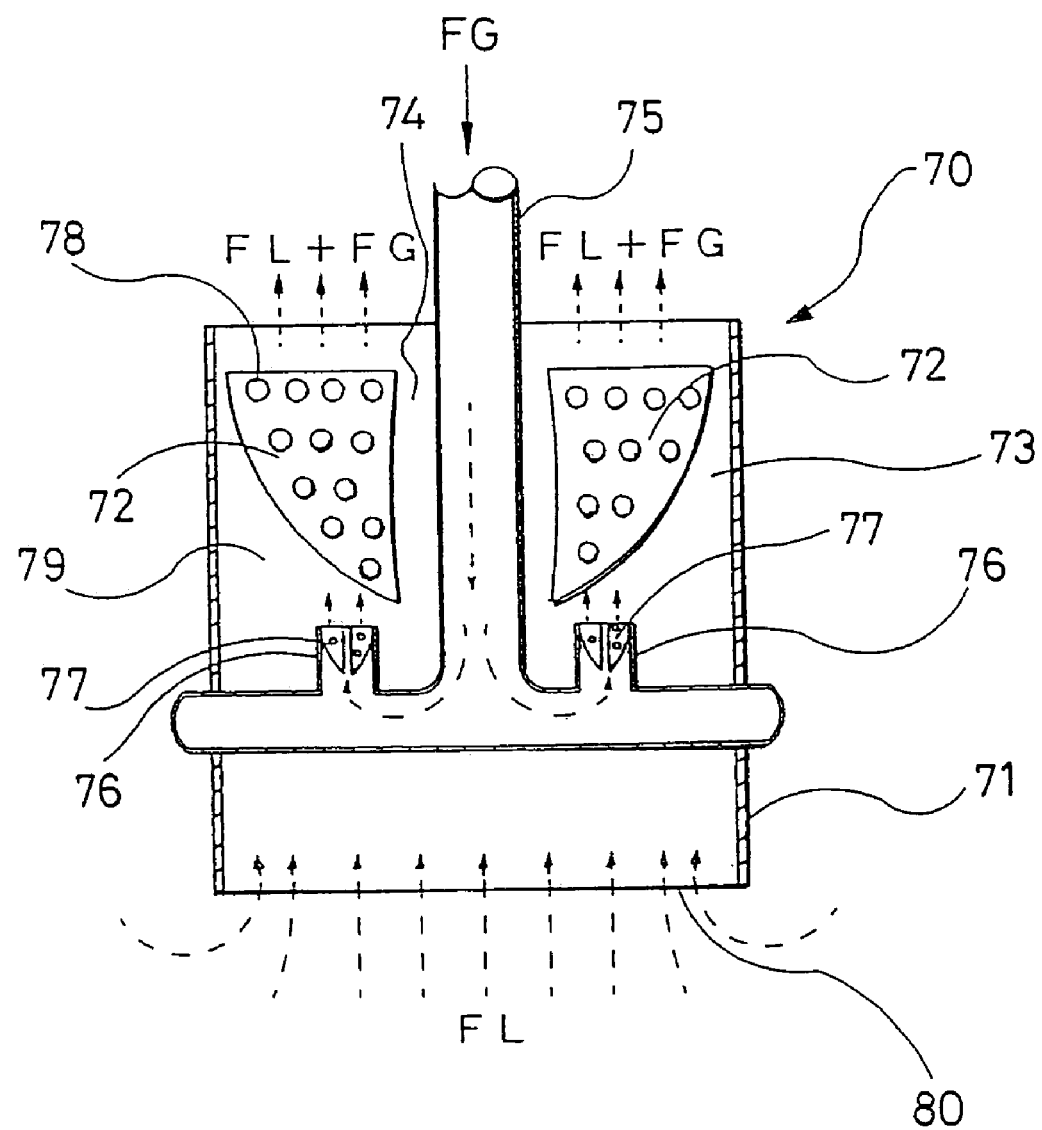
FIG. 11 is a schematic sectional view of a diffused gas aeration apparatus according to a third embodiment of the present invention.
Figure 12:
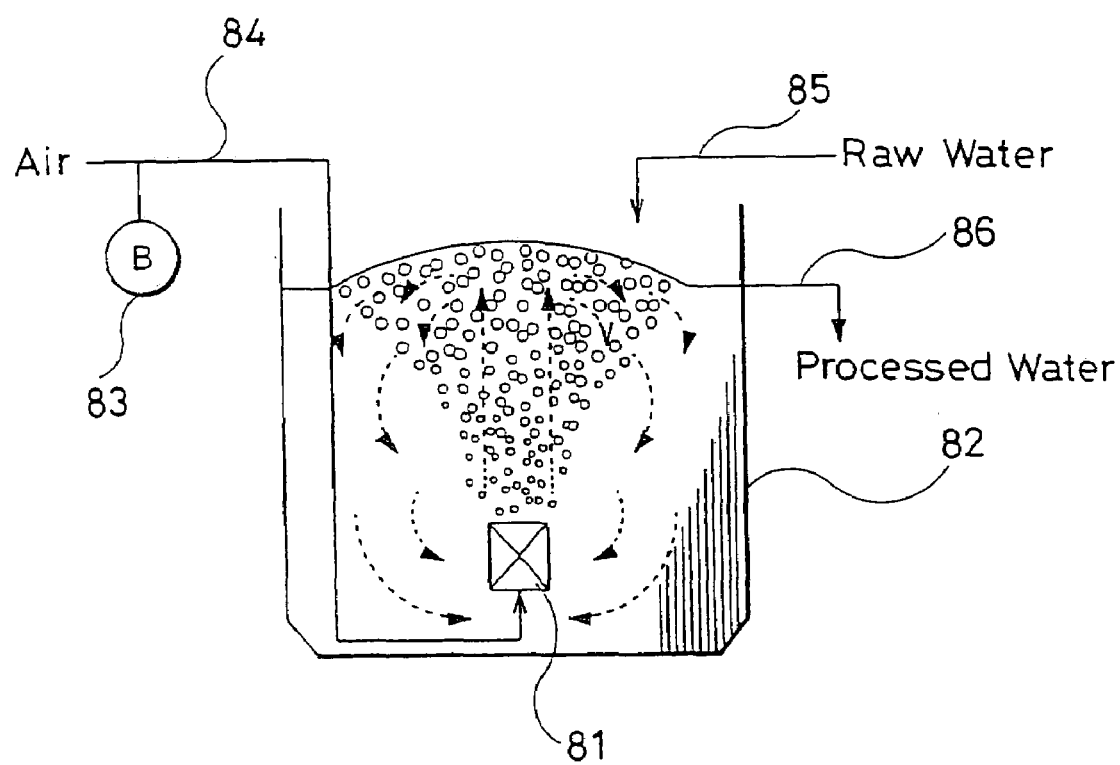
FIG. 12 is a diagram showing an example when a diffused gas aeration apparatus according to the present invention is applied to aeration processing of an activated sludge method.
Figure 13:
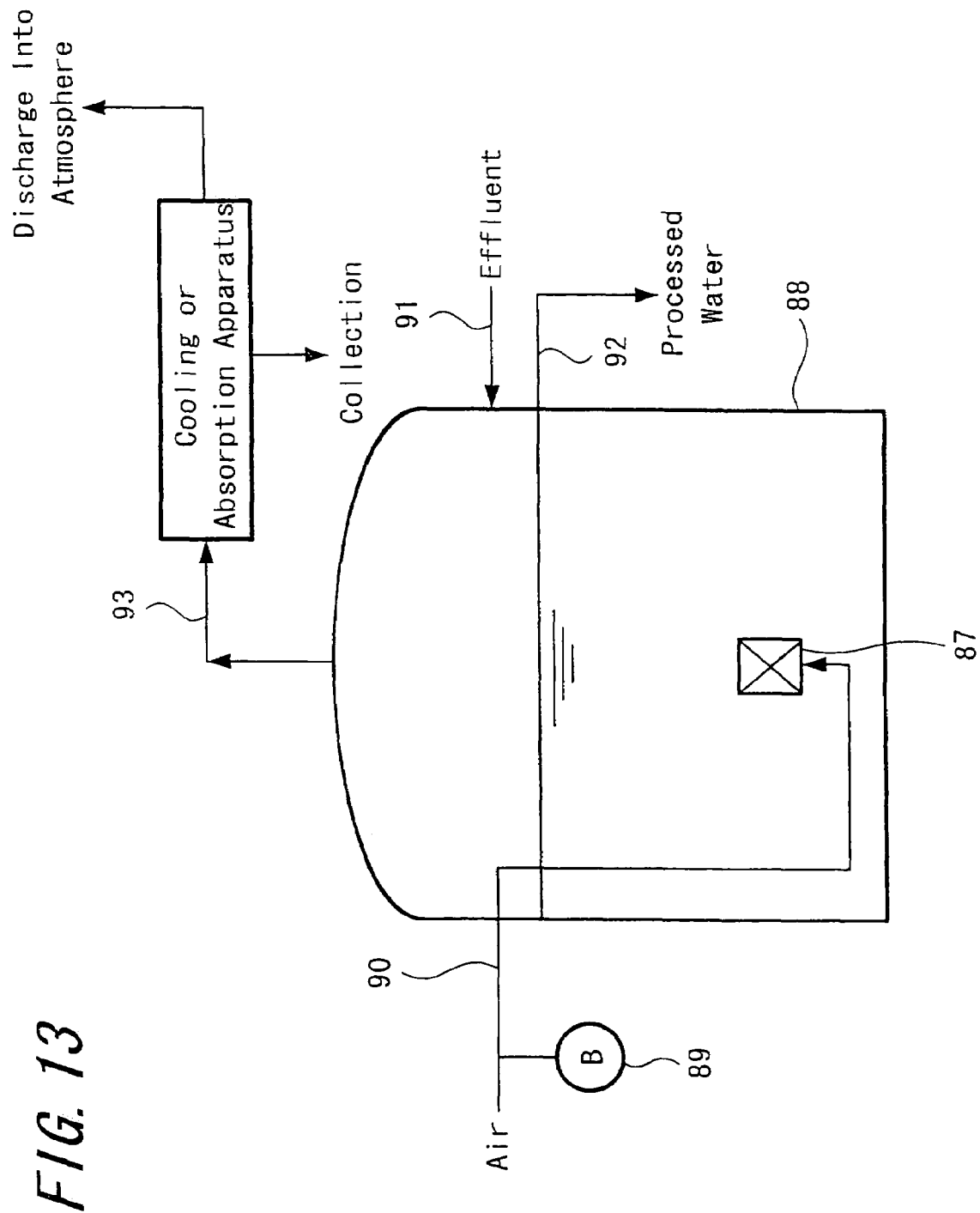
FIG. 13 is a diagram showing an example when the diffused gas aeration apparatus according to the present invention is applied to the diffusion processing of effluent.
Figure 14:
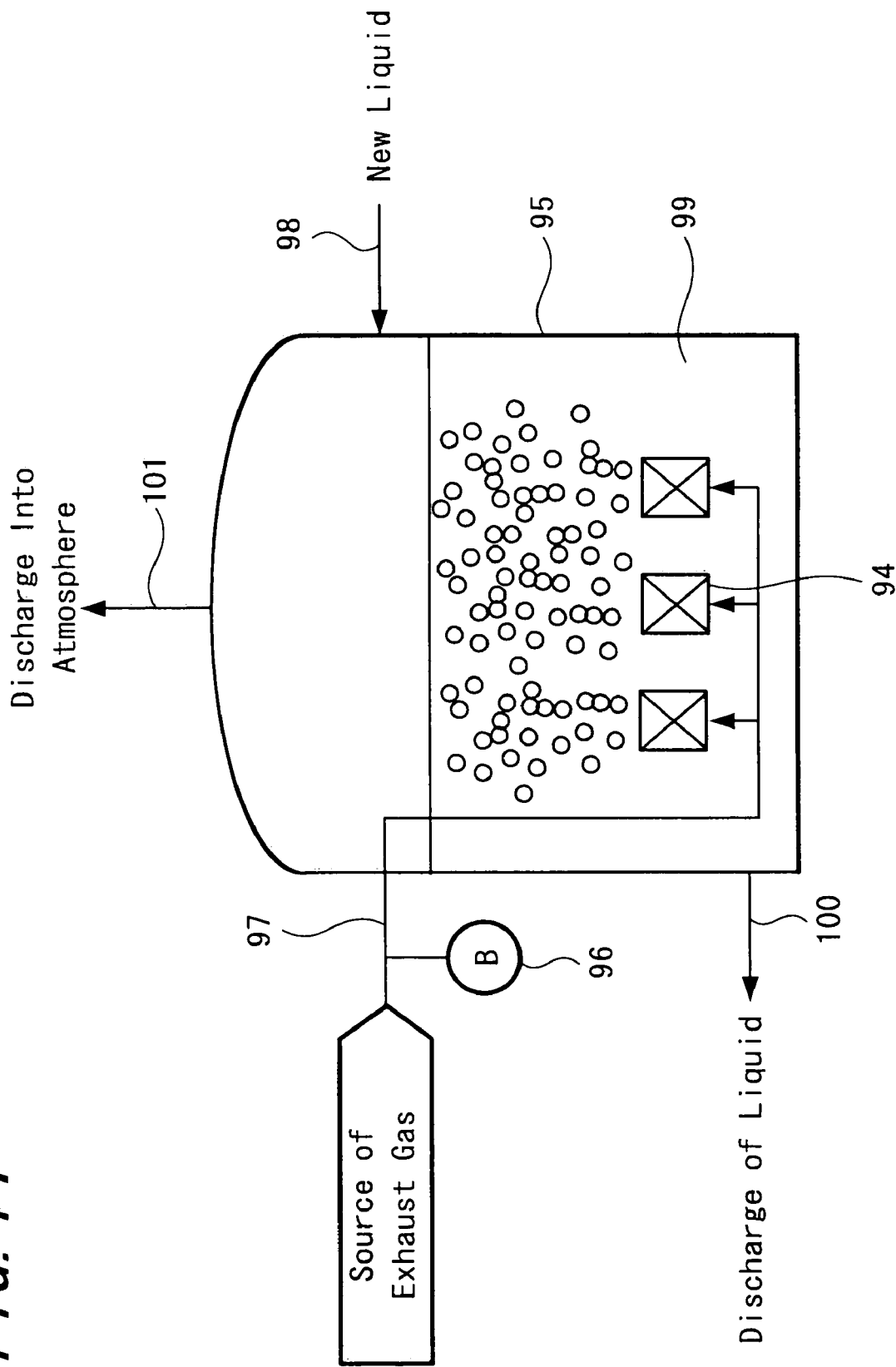
FIG. 14 is a diagram showing an example when the diffused gas aeration apparatus according to the present invention is applied to an exhaust gas treating apparatus.
Figure 15:
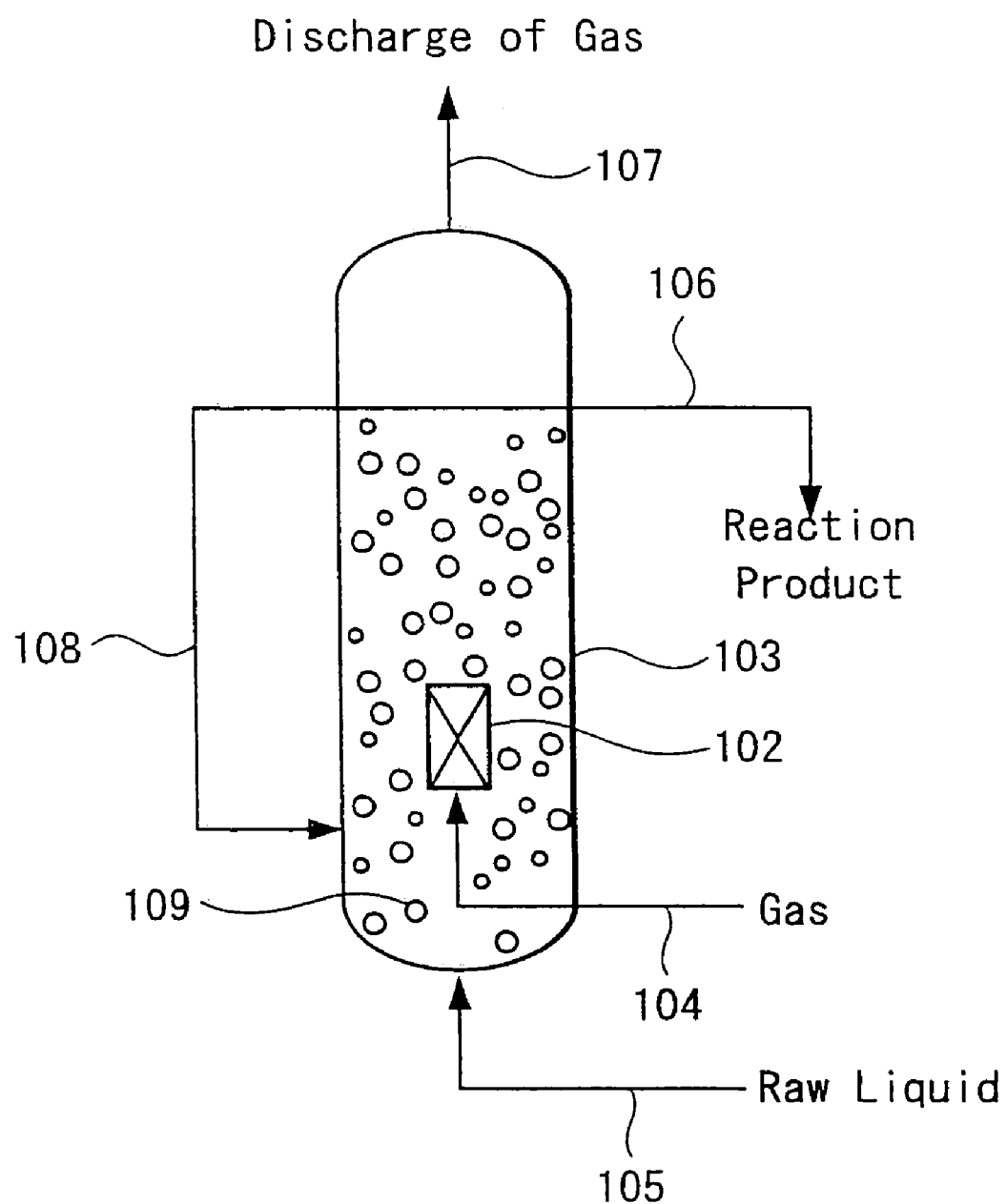
FIG. 15 is a diagram showing an example when the diffused gas aeration apparatus according to the present invention is applied to biological reaction using enzymes or microorganisms.
Figure 16:
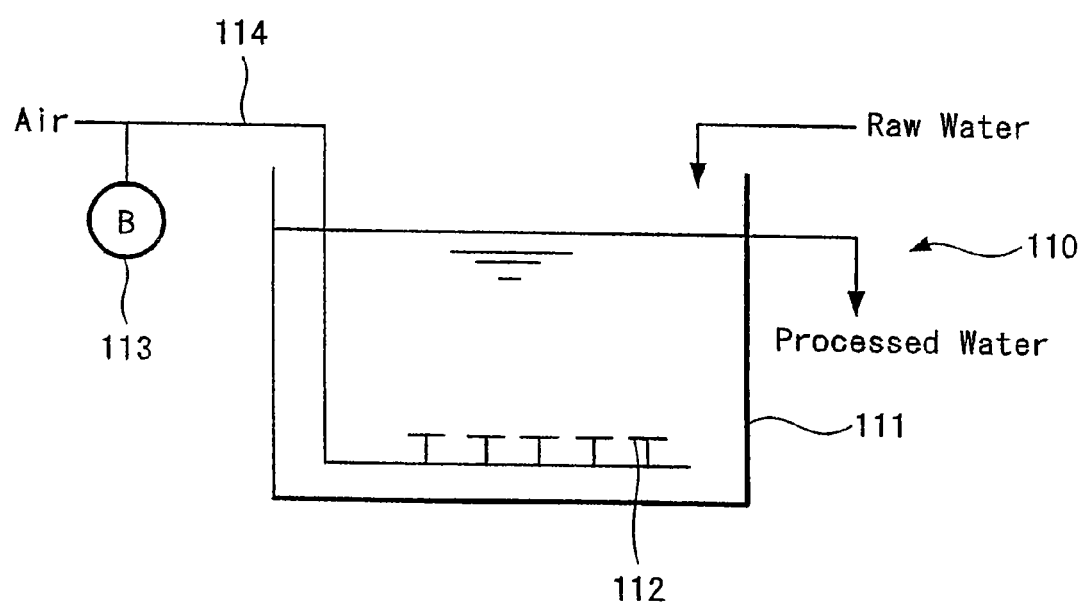
FIG. 16 is a pattern diagram showing an aeration processing apparatus of a conventional panel diffuser method.
Figure 17:
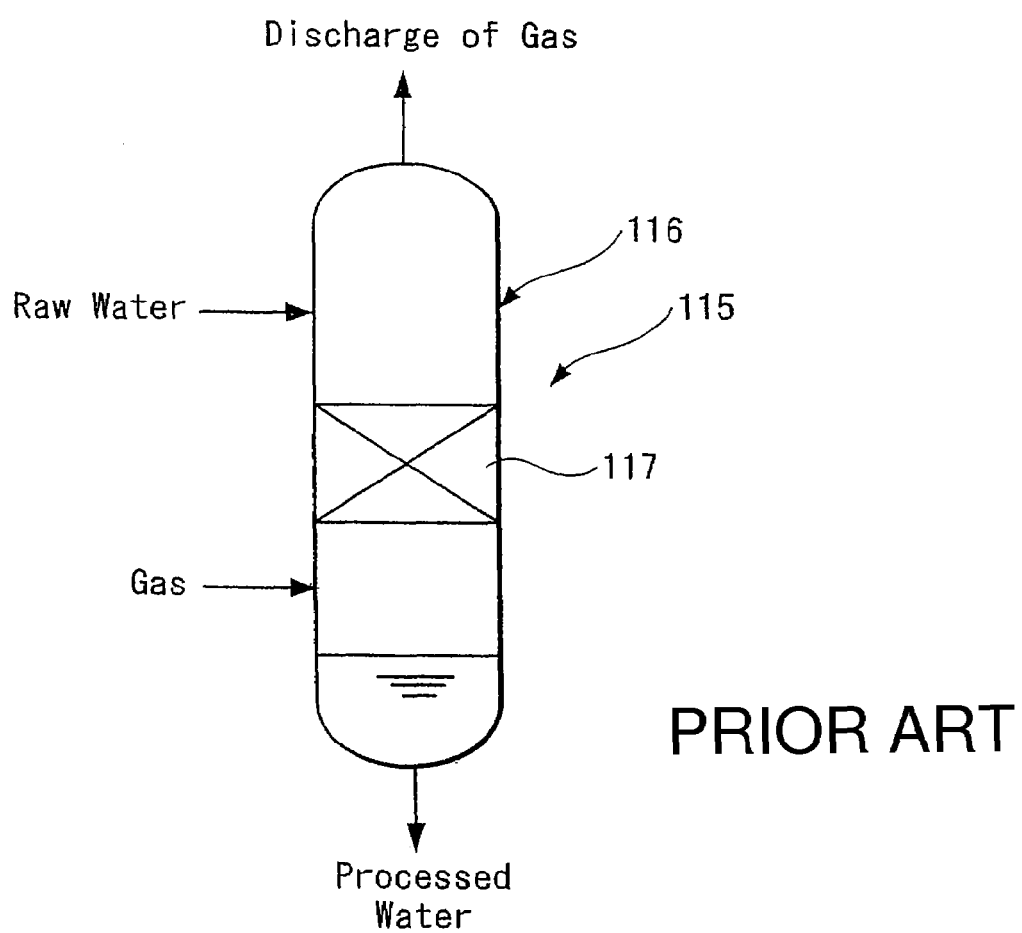
FIG. 17 is a pattern diagram showing a diffusion processing apparatus of a conventional packing method.

Hereinafter, embodiments of the present invention will be explained referring to the attached drawings. FIG. 1 is a pattern diagram showing a first embodiment according to the present invention. Similarly, FIG. 2 is a pattern diagram of a second embodiment, similarly FIG. 3 is a pattern diagram showing a third embodiment, FIGS. 4A and 4B are perspective views of passage tubes with blades, showing an embodiment of a static mixer used in the present invention, and FIG. 5 is a basic constitutional diagram showing an embodiment of a static mixer used in the present invention. FIG. 6 is a schematic diagram of a diffused gas aeration apparatus according to a first embodiment of the present invention, and FIG. 7 is a perspective view showing an embodiment of a spray nozzle used in a first embodiment of the present invention. Similarly, FIG. 8 is a schematic view of a diffused gas aeration apparatus according to a second embodiment of the present invention. FIG. 9 is a partly schematic bottom view of a diffused gas aeration apparatus according to a second embodiment of the present invention. FIG. 10 is a partly schematic perspective view of a gas blowoff portion according to a second embodiment of the present invention. FIG. 11 is a schematic sectional view of a diffused gas aeration apparatus according to a third embodiment of the present invention. FIG. 12 is a block diagram showing an embodiment when a diffused gas aeration apparatus according to the present invention is applied to aeration processing of an activated sludge method. FIG. 13 is a block diagram showing an embodiment when the apparatus is similarly applied to diffusion processing of effluent. FIG. 14 is a block diagram showing an embodiment when the apparatus is similarly applied to an exhaust gas treating apparatus, FIG. 15 is a block diagram showing an embodiment when the apparatus is similarly applied to biological reaction using enzymes or microorganisms, FIG. 16 is a pattern diagram showing an aeration processing apparatus of a conventional panel diffuser method, and FIG. 17 is a pattern diagram showing a diffusion processing apparatus of a conventional packing method.

Embodiment 1

FIG. 1 is a pattern diagram showing a first embodiment according to the present invention. In a cylindrical passage tube 1 substantially disposed vertically in which fluid passes in the longitudinal direction, a set of static mixer 2 is provided; a gas blowoff portion 5 in which a spray nozzle that supplies gas through a pneumatic dispatch line 4 is provided is disposed in a space portion 3 below the static mixer 2; and a liquid-introducing portion 6 which introduces liquid (FL) is disposed further below the gas blowoff portion 5. In a diffused gas aeration apparatus 7 which is thus constructed, gas (FG) is gushed and supplied in the upward direction from the gas blowoff portion 5 to the lower end of the static mixer 2 in the passage tube 1 through the space portion 3, and by means of air-lift effect generated by the ascending force of the gas (FG), liquid (FL) is introduced from the liquid-introducing portion 6 on the lower end of the passage tube 1 into the space portion 3 in the passage tube 1. The gas (FG) and accompanying liquid (FL) flow upward in a parallel direction through the static mixer 2 to be made fine and in gas-liquid contact, and then are discharged into liquid. Thus, aeration, diffusion or chemical reaction progresses between liquid and gas with sufficient gas-liquid contact.

In addition, it is preferable that the gas blowoff portion 5 be disposed in the range of 0.2 to 3 times the diameter of the static mixer 2 away from the lower end of the static mixer 2. Further, the liquid-introducing portion 6 may be used, with an opening provided in the tube wall at the lower part of the passage tube 1. With this, the circulating flow of liquid improves.

In this embodiment, by gushing and supplying gas (FG) from below the static mixer 2 in the upward direction from the spray nozzle of the gas blowoff portion 5 through the pneumatic dispatch line 4, the ascending force of rising gas (FG) generates air-lift effect, whereby gas (FG) which rises involving liquid (FL) introduced from the lower part of the passage tube 1 and the liquid (FL) flow in a parallel direction through the static mixer 2. As a result, gas (FG) and liquid (FL) are made fine and in gas-liquid contact by the mixture and agitation function and then are discharged into liquid, where aeration, diffusion or chemical reaction is executed. Since the above gas-liquid mixture and agitation operation are executed without power and with high efficiency, energy can be saved.

Embodiment 2

FIG. 2 is a pattern diagram showing a second embodiment of the present invention. In a cylindrical passage tube 8 substantially disposed vertically in which fluid passes in the longitudinal direction, a set of static mixer 9 is provided and a gas blowoff portion 12 that supplies gas (FG) through a pneumatic dispatch line 11 is disposed in a space portion 10 below the static mixer 9. In the gas blowoff portion 12 is provided a static mixer 13. Further, below the static mixer is disposed a liquid-introducing portion 14 which introduces liquid (FL). In a diffused gas aeration apparatus 15 thus constructed, gas (FG) is gushed and supplied from the static mixer 13 provided in the gas blowoff portion 12 on the lower end of the static mixer 9 in the passage tube 8 through the space portion 10. Liquid (FL) is introduced from the liquid-introducing portion 14 on the lower end side of the passage tube 8 into the space portion 10 by means of air-lift effect generated by the ascending force of the gushing gas (FG). Gas (FG) which has been made fine and accompanying liquid (FL) flow upward in a parallel direction through the static mixer 9 to be in gas-liquid contact and then to be discharged into liquid. Thus, aeration, diffusion and chemical reaction progress with liquid and gas in gas-liquid contact sufficiently.

Embodiment 3

FIG. 3 is a pattern diagram showing a third embodiment according to the present invention. In a cylindrical passage tube 16 in which fluid passes and a set of static mixer 17 is provided, and a plurality of gas blowoff portions 20 which supply gas (FG) through a pneumatic dispatch line 19 are disposed in a space portion 18 below the static mixer 17. The pneumatic dispatch line 19 is provided from top to bottom through an opening in the longitudinal direction of the static mixer 17.

In a diffused gas aeration apparatus 21 thus constructed, by gushing and supplying gas (FG) from under the static mixer 17 in the upward direction from the gas blowoff portions 20 through the pneumatic dispatch line 19, liquid (FL) introduced from a liquid-introducing portion 22 on the lower end side of the passage tube 16 and rising gas flow in a parallel direction through the static mixer 17, so that gas-liquid contact proceeds in the same manner as described above.

In addition, by providing the gas blowoff portions 20 with static mixers to be used similarly to the second embodiment of the present invention, gas-liquid contact efficiency will further be improved. The number of gas blowoff portions 20 can be flexibly decided, depending upon the purpose.

Further, a passage tube 16 with a wide bore (500 mm or more in diameter) can be used when providing a plurality of gas blowoff portion 20, which enables gas-supplying ability per passage tube to improve a great deal, so that processing time can be shortened. Further, since the number of pneumatic dispatch lines arranged decreases, piping work costs and maintenance costs are also reduced to be low. Further, the enlargement of an apparatus can be facilitated.

FIGS. 4A and 4B show an example of static mixers 2, 9, 13 and 17 used in the first to third embodiments of the present invention. FIG. 4A is a schematic perspective view of a passage tube with right twisted spiral blades, and FIG. 4B is a schematic perspective view of a passage tube with left twisted blades. In FIG. 4A, three right twisted blades 25 are provided in a static mixer 24 disposed in a cylindrical passage tube 23. The blades 25 are formed of perforated boards with a number of holes 26. Further, there are provided three fluid passages 27, and the fluid passages 27 are continuously joined to each other in the whole longitudinal direction of the blades 25 through an opening 28.

In FIG. 4B, three left twisted blade bodies 31 are provided in a static mixer 30 disposed in a cylindrical passage tube 29. The blades 31 are formed of perforated boards with a number of holes 32. Further, there are three fluid passages 33 are provided, and the fluid passages 33 are continuously joined to each other in the whole longitudinal direction of the blades 31 through an opening 34. In the passage tubes 23 and 29 in which the static mixer 24 and 30 are disposed, respectively constructed as shown in FIGS. 4A and 4B, while flowing through right twisted or left twisted spiral blades, gas (FG) and liquid (FL) are made to be in gas-liquid contact by continuously repeating the turning and dividing in the rightward or leftward direction, and dividing, joining, turning over, and shearing stress reaction; and then are discharged into liquid.

In addition, preferably the diameter of the holes (26 and 32) provided in the blades 25 and 31 is in the range of 5 to 30 mm, and preferably the aperture ratio of the holes (26 and 32) is in the range of 5 to 80%. Further, preferably the rising rate of gas in the passage tubes (23 and 29) is in the range of 0.1 to 10 m/s, more preferably 0.5 and 5 m/s. Furthermore, preferably the twisted angle (turning angle) of the blades 25 and 31 is 900, 1800 or 2700; however, 150, 300, 450, 600 or the like can also be used. In the case where a passage tube with a wide bore (500 mm or more in diameter) is made, it is possible to make blades (25 and 31) of small twist angles such as 15° and 30°, and to connect three blades with the arrangement of 30°+30°+30°=90°, for example. By doing so, production and processing can be made easy, and the cost of production becomes low. It should be noted that it is possible to accordingly select an arrangement of blades of different twist angles.

FIG. 5 is a diagram showing another example of static mixers 2, 9, 13 and 17 used in the first to third embodiments of the present invention.

In the static mixer shown in FIG. 5, right twisted and left twisted spiral blades 36 and 37 having a plurality of fluid passages are provided in a cylindrical passage tube 35 with a cylindrical space portion 38 in between. Further, a cylindrical space portion 39 is formed below the left twisted blade 37. Note that the arrangement of the right twisted and left twisted blades 36 and 37 in the passage tube 35 is not limited to this basic constitutional diagram, and the blades 36 and 37 can be arranged accordingly, for example, as follows: right+left+right; right+left+right+left; etc. In the passage tube 35 thus constructed, while flowing upward in a parallel direction from the lower part of the passage tube 35 through the space portion 39, through the left twisted blade 37, the space portion 38 and the right twisted blade 36, gas (FG) and liquid (FL) are made in gas-liquid contact by continuously repeating the turning and dividing in the leftward and rightward directions, joining, turning over and shearing stress effect, and then are discharged into liquid.

FIG. 6 is a schematic diagram of a diffused gas aeration apparatus according to the first embodiment of the present invention (refer to FIG. 1). A diffused gas aeration apparatus 40 includes a cylindrical passage tube 43 in which a static mixer 41 is provided and a space portion 42 is provided below the static mixer 41, and two supporting boards 46 in which a gas blowoff portion 44 is provided to be connected to a pneumatic dispatch tube 45 which supplies gas. The pneumatic dispatch tube 45 has the gas blowoff portion 44 provided with a spray nozzle that gushes gas in the vertical direction, and the side opposite to the side where gas enters is closed. The diffused gas aeration apparatus 40 thus constructed is disposed in liquid, and with respect to gas (FG), pressurized gas (FG) is supplied from the gas blowoff portion 44 to the inside of the space portion 42 of the passage tube 43 through the pneumatic dispatch tube 45 by means of a blower, compressor or the like. The gas (FG) involving liquid (FL) from a liquid-introducing portion 47 on the lower end of the passage tube 43 and making the liquid (FL) accompany the gas (FG) by means of air-lift effect generated by the ascending force of the gas (FG) supplied, the gas (FG) and the liquid (FL) flow in a parallel direction through the static mixer 41 to be in gas-liquid contact, and then are discharged into liquid, where aeration, diffusion and reaction treatment are performed. Using the spray nozzle for the gas blowoff portion 44, gas (FG) is dispersed in liquid (FL) efficiently, thereby improving gas-liquid contact efficiency. It is preferable that this spray nozzle 48 be the one shown in FIG. 7, which is a conical, multilayered structure capable of being in a blowoff state.

FIG. 8 is a schematic diagram of a diffused gas aeration apparatus according to the second embodiment of the present invention. Similarly to first embodiment shown in FIG. 6, a diffused gas aeration apparatus 49 includes a cylindrical passage tube 50 which has at its lower part a space portion 52 and a liquid-introducing portion 53, a cylindrical pneumatic dispatch tube 55 which has a static mixer 51 and a gas blowoff portion 54, and two supporting boards 56 which support the passage tube 50 and the pneumatic dispatch tube 55. At the gas blowoff portion 54 is disposed a static mixer 57 formed of a plurality of right twisted spiral blades. Gas-liquid contact effect between gas (FG) and liquid (FL) is omitted on the grounds that it is similar to the above-described FIG. 6; since the static mixer 57 has been disposed at the gas blowoff portion 54 of the pneumatic dispatch tube 55, gas (FG) flows upward together with liquid (FL) in the space portion 52 of the passage tube 50 made to be fine by means of the occurrence of turbulence. The gas (FG) which has been made into fine structure and the liquid (FL) flow through the static mixer 51 to be in gas-liquid contact highly efficiently, and then are discharged into liquid, where aeration, diffusion and reaction treatment are operated.

FIG. 9 is a partly schematic bottom view of a diffused gas aeration apparatus according to the second embodiment of the present invention. The bottom surface of a diffused gas aeration apparatus 58 includes three right twisted blades 60 provided inside a cylindrical passage tube 59 and a cylindrical pneumatic dispatch tube 61. The blades 60 are formed of perforated boards with a number of holes 62 bored in the thickness direction and have an opening 63 in the whole longitudinal direction of the blades 60.

FIG. 10 is a partly schematic perspective view of a gas blowoff portion according to the second embodiment of the present invention. A pneumatic dispatch tube 64 has an inverted T-shape, a gas blowoff portion 65 is provided with three right twisted spiral blades 66 to form three fluid passages 67, and the fluid passages 67 are continuously joined to each other in the whole longitudinal direction of the blades 66 through an opening 68. The blades 66 are formed of perforated boards with a number of holes 69 that have been bored in the thickness direction. In this pneumatic dispatch tube 64, with respect to the flow of gas (FG), turbulence is caused by straight flow which moves straight through the opening 68, spiral flow which flows along the three spiral blades 66, and divided flow which passes through the holes 69 of the blades 66, so that gas (FG) is made into fine structure. Utilizing the gas (FG) of the fine structure, gas-liquid contact efficiency further improves. It should be noted that the twist direction of the blades 66, the twist angle thereof, the combination of the twist direction and angle thereof, the diameter of the holes thereof, and the aperture ratio of the holes thereof can be selected accordingly from a variety of examples. Further, it is preferable that the gas blowoff portion 65 be positioned at the distance of 0.2 to 3 times the diameter of the passage tube away from the lower end side of the static mixer provided in the above described passage tube 59.

FIG. 11 is a schematic sectional view of a diffused gas aeration apparatus according to the third embodiment of the present invention. With respect to a diffused gas aeration apparatus 70, two or more 90° right twisted blades 72 are provided in a cylindrical passage tube 71 in which fluid passes to form a static mixer 73; a cylindrical pneumatic dispatch tube 75 which supplies gas is disposed through an opening 74 in the static mixer 73; two gas blowoff portions 76 are disposed; and static mixers 77 are provided in the gas blowoff portions 76. The blades 72 are formed of perforated boards with a number of holes 78. In the diffused gas aeration apparatus 70 thus constructed, gas (FG) pressurized by gas-supplying means such as a blower, compressor, gas cylinder (not shown in the figure), etc. is gushed and supplied in the upward direction from below the static mixer 73 through the pneumatic dispatch tube 75, the gas blowoff portion 76 and a space portion 79. By means of air-lift effect generated by the ascending force of the gas (FG), liquid (FL) is introduced from a liquid-introducing portion 80 at the lower end of the passage tube 71 into the space portion 79 in the passage tube 71. The gas (FG) and accompanying liquid (FL) flow upward in a parallel direction in the passage tube 71 through the static mixer 73 to be made into fine structures and to be made in gas-liquid contact by means of mixture and agitation, and then are discharged into liquid. Thus, aeration, diffusion or chemical reaction continuously proceeds with liquid and gas being in gas-liquid contact with high efficiency. It should be noted that, similarly to the above described embodiments, the twist direction of spiral blades used in the embodiment; the twist angle thereof; the number thereof; the diameter of the holes thereof; the aperture ratio, diameter and height of perforated boards; etc. can be decided accordingly to the use. Since the bore of the passage tube 71 has been enlarged a great deal (500 mm or more in diameter), it is possible for the diffused gas aeration apparatus 70 to obtain energy saving due to improvement in gas-providing ability per piece of apparatus, leading to reaction management time to be shortened, space saving due to decrease in the volume of an aeration tank, and maintenance-free nature with a construction in which stagnant parts (dead spaces) of fluid do not arise.

APPLICATION EXAMPLE 1

FIG. 12 is a diagram showing an example when a diffused gas aeration apparatus according to the present invention is applied to aeration processing of an activated sludge method.

A diffused gas aeration apparatus 81 is disposed at the bottom of an aeration tank 82 storing raw water, and includes a blower 83 and a pneumatic dispatch line 84 supplying air to the lower part of this diffused gas aeration apparatus 81, a raw water supplying line 85 supplying raw water, and a processed water discharging line 86 discharging processed water. Further, it is preferable that a liquid-introducing portion of the diffused gas aeration apparatus 81 be positioned at the distance of 50 to 200 mm away from the bottom of the aeration tank 82. In the diffused gas aeration apparatus 81 thus constructed, by means of air-lift effect generated by the ascending force of air supplied from the lower part of the diffused gas aeration apparatus 81 through the blower 83 and the pneumatic dispatch line 84, while flowing in a parallel direction through the diffused gas aeration apparatus 81, raw water and air are mixed and agitated, with oxygen in the air dissolved in the raw water and the raw water cleaned the number of times intended or repeatedly by aerobic microbes, and then are discharged from the processed water discharging line 86.

Additionally, preferably the supply rate of the amount of air which flows from the lower side to the upper side inside the diffused gas aeration apparatus 81 is, when the depth of water inside the aeration tank 82 is 2 to 6m, in the range of 1800 to 21000 $Nm^3/(m^2 \cdot hour)$, and more preferably in the range of 3600 to 12000 $Nm^3/(m^2 \cdot hour)$. Further, when a diffused gas aeration apparatus 81 with a diameter of 150 mm is used, the area for aeration and agitation per piece of apparatus is 3 to 8 $m^2$. Furthermore, the blowoff pressure of the blower 83 may be the sum of the underwater pressure and the pressure loss of the pneumatic dispatch line 84. Hereupon, symbol N denotes a normal state of the volume $(m^3)$ at a pressure equal to or less than 1 atm at 0 degree centigrade.

When comparing air-flow resistance of a conventional panel diffuser method to that of the method according to the present invention, the resistance by the method of the present invention is ⅕ to ⅗. Further, the compared results of performance of conventional methods A, B, and C in which static mixers provided inside diffuser pipes are used, with the method by the present invention is shown in Table 1. As shown in Table 1, according to the method of the present invention, the air-supplying ability per piece of apparatus is 100 $Nm^3/(m^2 \cdot hour)$, whereas the conventional methods are 80, 12, and 17 $Nm^3/(m^2 \cdot hour)$. Similarly, regarding the oxygen absorption efficiency: 13.5% against 8.3, 10.5, and 13.0%.

TABLE 1

|  | Present Invention | Conventional Method A | Conventional Method B | Conventional Method C |
|---|---|---|---|---|
| Volume of Gas-Liquid Mixture Portion ($m^3$) | 0.006 | 0.005 | 0.105 | 0.124 |
| Air-supplying Ability ($Nm^3/m^2 \cdot min$/apparatus) | 100 | 80 | 12 | 17 |
| Oxygen Absorption Efficiency % (Absorbed Amount/Supplied Amount × 100) | 13.5 | 8.3 | 10.5 | 13.0 |

APPLICATION EXAMPLE 2

FIG. 13 is a diagram showing an example when a diffused gas aeration apparatus according to the present invention is applied to the diffusion processing of effluent.

Similarly to the example shown in FIG. 12, a diffused gas aeration apparatus 87 according to the present invention is disposed at the bottom of a cylindrical diffusion tank 88; a blower 89 and a pneumatic dispatch line 90 which supply air to the lower part of this diffused gas aeration apparatus 87, an effluent-supplying line 91 which supplies effluent, and a processed water discharging line 92 which discharges processed water that has been cleaned are provided. Further, an exhaust line 93 is provided with a cooling apparatus or an absorption apparatus which collects volatile substances. In the diffused gas aeration apparatus 87 thus constructed, volatile substances in effluent such as trichloromethane, trihalomethane, ammonia, chlorine and krypton are moved toward the supplied air to be in diffusion processing, and then are collected and cleaned by the cooling apparatus or the absorption apparatus through the exhaust line 93. The cleaned air is released to atmospheric air.

It should be noted that the kind of gas supplied is not limited to the air, and inactive gasses such as nitrogen, helium, argon and carbon monoxide gas can be used accordingly. For example, diffusion processing can be performed with respect to oxygen which remains dissolved in liquid, by using nitrogen gas. Preferably, the supplying rate of gas to be supplied to the inside of the diffused gas aeration apparatus 87 is, when the depth of water inside the diffusion tank 88 is 1 to 3m, in the range of 3600 to 18000 $Nm^3/(m^2 \cdot hour)$, and more preferably in the range of 7200 to 15000 $Nm^3/(m^2 \cdot hour)$.

APPLICATION EXAMPLE 3

FIG. 14 is a block diagram showing an embodiment when diffused gas aeration processing according to the present invention is applied to exhaust gas treatment.

A plurality of diffused gas aeration apparatuses 94 are disposed in predetermined positions in a cylindrical reaction tank 95, and below the diffused gas aeration apparatuses 94 is provided a pneumatic dispatch line 97 that supplies exhaust gas through a blower 96, and a new liquid supplying line 98 which supplies water or absorbed liquid, a discharging line 100 which discharges absorption liquid 99 to the outside of the reaction tank 95 and an exhaust line 101 which discharges exhaust gas that has been cleaned from the top of the reaction tank 95 are provided. In the diffused gas aeration apparatus 94 thus constructed, exhaust gas containing HCl, $SO_x$, $NO_x$, $NH_3$, $H_2S$, dust, etc. is supplied from under the diffused gas aeration apparatus 94 through the blower 96 and the pneumatic dispatch line 97 and is made to be in gas-liquid contact with an absorption liquid made of an alkaline solution such as NaOH, $CaCO_3$, $Ca(OH)_2$, $Mg(OH)_2$, etc. or of an acid solution such as $H_2SO_4$, HCl, etc., making chemical reaction treatment proceed, then the result is dissolved or trapped in liquid, and waste gas cleaned is discharged into atmospheric air through the exhaust line 101.

In the case where this diffused gas aeration apparatus 94 is applied to the removal or trapping of foreign substances in waste gas, waste gas and liquid are mixed and agitated highly efficiently making short-time processing possible, in comparison with a gas-liquid contact method by means of conventional panel diffusers, diffuser pipes, etc. Further, improvement in processing speed leads to saving space and reducing apparatus costs. Furthermore, disposing the diffused gas aeration apparatus 94 with a wide bore (500 mm or more in diameter) improves processing capability and results in further space saving. Moreover, since a stagnant part (dead space) of fluid is unlikely to occur in the diffused gas aeration apparatus 94, the accretionary growth of calcium and the like can be prevented, which lowers maintenance costs.

APPLICATION EXAMPLE 4

FIG. 15 is a diagram showing an example when a diffused gas aeration apparatus according to the present invention is applied to reaction by means of enzymes or microorganisms.

A diffused gas aeration apparatus 102 is disposed in a predetermined position in a cylindrical bioreactor 103, and a pneumatic dispatch line 104 that supplies gas to the lower part of the diffused gas aeration apparatus 102, a raw liquid supplying line 105 which supplies raw liquid, a reaction product discharging line 106 which discharges reaction products, an exhaust line 107 which discharges gas from the top of the bioreactor 103 and a circulating liquid line 108 which circulates raw liquid from the liquid surface level of the bioreactor 103 to the lower part are provided. Further, in the bioreactor 103, either a catalyst supporting body 109 which supports enzymes or microorganisms, or a biocatalyst exists in liquid. In the diffused gas aeration apparatus 102 thus constructed, gas is supplied from the lower part of the diffused gas aeration apparatus 102 through the pneumatic dispatch line 104 by gas-providing means such as a blower, compressor, gas cylinder (not shown in the figure), etc., and raw liquid is supplied through the raw liquid supplying line 105 by supplying means such as a pump or pressurization.

Reaction products and gas are discharged to the outside by the reaction product discharging line 106 and the exhaust line 107. Further, raw liquid forms circulating flow from the liquid surface level to the lower part of the bioreactor 103 using the circulating liquid line 108. Gas and raw liquid flow in a parallel direction through the diffused gas aeration apparatus 102, and biological reaction proceeds by means of the biocatalytic function of enzymes or microorganisms in raw liquid. In the case where the diffused gas aeration apparatus 102 of the present invention is used as a bioreactor, the gas flow rate in the bioreactor can be operated in a high gas flow rate range of 0.1 to 5 m/s, in comparison with a conventional bubble column method, and high oxygen moving rate can therefore be obtained. Further, since the oxygen moving rate is equalized by agitating and making a flow rate distribution in the bioreactor even, dead spaces are prevented from occurring to enable a large-sized apparatus to be obtained, so that the amount of production will further be improved. Further, the channeling of gas can be prevented, and gas dispersion in highly viscous liquid can be improved. Furthermore, improvement in reaction speed leads to space-saving and energy-saving, and so the cost of production can be reduced. In addition the apparatus can be used as a gas-liquid reaction apparatus without using biocatalysts. In addition, in a conventional bubble column, the superficial speed of gas is in the range of 0.01 to 0.1 m/s.

FIG. 16 is a pattern diagram showing an aeration processing apparatus by means of a conventional panel diffuser method.

As regards a conventional aeration processing apparatus 110, a number of panel diffusers 112 are provided at the bottom surface in an aeration tank 111, and air is supplied to a number of panel diffusers 112 through a blower 113 and a pneumatic dispatch line 114. The panel diffusers 112 are formed of minute perforated bodies, generating minute bubbles. The amount of blowoff air by conventional panel diffusers 112 is 50 to 400L/min. Also, the air-flow resistance is 1000 to 3000 Pa.

FIG. 17 is a pattern diagram showing a diffusion processing apparatus by means of a conventional packing method. Regarding a conventional diffusion processing apparatus 115, packing is packed regularly or in irregular manner in a cylindrical diffusion column 116. Gas and raw water pass through packing 117, flowing in opposite directions to each other to be in gas-liquid contact, and diffusion processing is thus executed. In the case of a conventional packing method, the supplying rate of gas is in the range of 10 to 100 $Nm^3/(m^2 \cdot hour)$.

Figure 18:
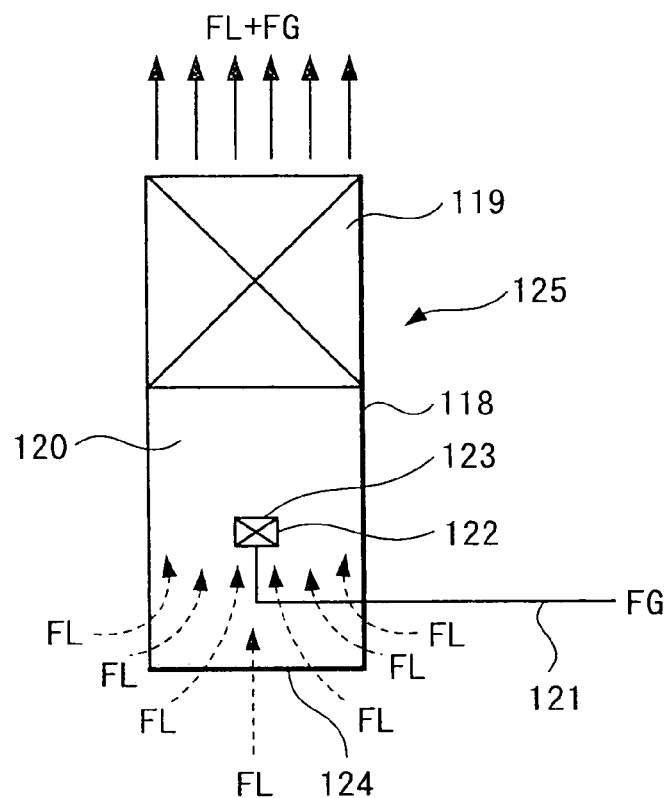
FIG. 18 is a pattern diagram showing a fourth embodiment of the present invention similarly to the above-described embodiment 2.

FIG. 18 is a pattern diagram showing a fourth embodiment of the present invention similarly to the above-described embodiment 2. In a cylindrical passage tube 118 substantially disposed vertically in which fluid passes in the longitudinal direction, a set of static mixer 119 is provided and a gas blowoff portion 122 that supplies gas (FG) through a pneumatic dispatch line 121 is disposed in a space portion 120 below the static mixer. Further, a liquid-introducing portion 124 which introduces liquid (FL) is disposed below the gas blowoff portion 122. In a diffused gas aeration apparatus 125 thus constructed, gas (FG) is gushed and supplied from a static mixer 123 in the gas blowoff portion 122 disposed below the static mixer 119 in the passage tube 118. Liquid (FL) is introduced into the space portion 120 from the liquid-introducing portion 124 on the lower end side of the passage tube 118 by means of air-lift effect generated by the ascending force of the gushed gas (FG). Gas (FG) made to be fine and accompanying liquid (FL) flow upward in a parallel direction through the static mixer 119 and come in gas-liquid contact to be discharged into liquid. Thus, aeration, diffusion and chemical reaction progress with liquid and gas coming in gas-liquid contact sufficiently.

Figure 19:
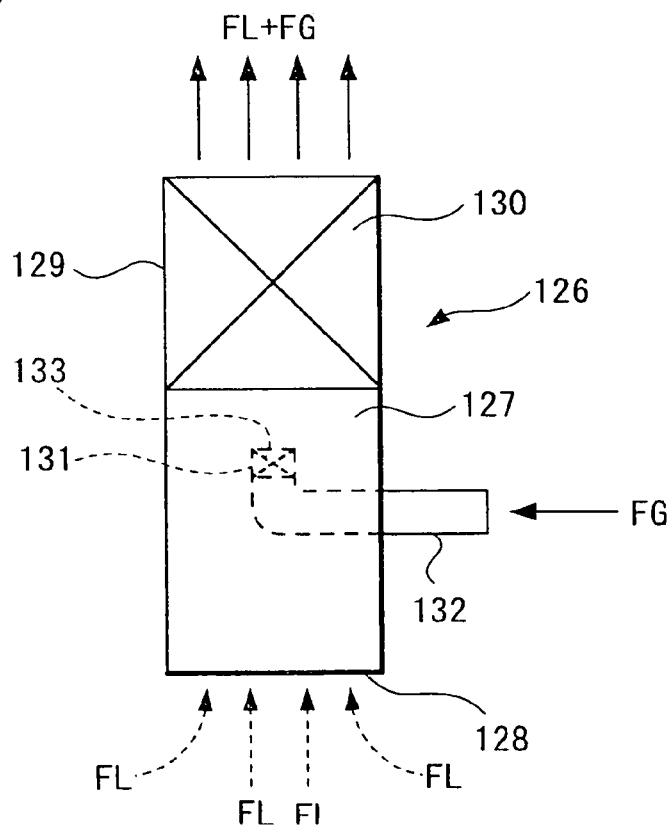
FIG. 19 is a schematic diagram of a diffused gas aeration apparatus according to a fourth embodiment of the present invention.

FIG. 19 is a schematic diagram of a diffused gas aeration apparatus according to a fourth embodiment of the present invention. A diffused gas aeration apparatus 126 includes: a cylindrical passage tube 129 in which a space portion 127 and a liquid-introducing portion 128 are provided in the lower part thereof, a static mixer 130, and a cylindrical pneumatic dispatch tube 132 which is disposed in the space portion 127 and which has a gas blowoff portion 131. The pneumatic dispatch tube 132 penetrates a side surface of the passage tube 129 to be provided in the space portion 127. A static mixer 133 formed of a plurality of right twisted spiral blades is disposed in the gas blowoff portion 131. Since gas-liquid contact effect between gas (FG) and liquid (FL) is similar to the above-described FIG. 8, explanation thereof is omitted. Further, the pneumatic dispatch tube 132 and the passage tube 129 are supported and fixed by means of adhesion, deposition or the like. In addition, in order to improve the mechanical strength of the fixed part of the pneumatic dispatch tube 132, the pneumatic dispatch tube 132 may be reinforced with a supporting board or the like. Furthermore, the spiral blades provided in the gas blowoff portion 131 are not limited to right twisted ones (clockwise) but may be left twisted blades (counterclockwise).

Figure 20:
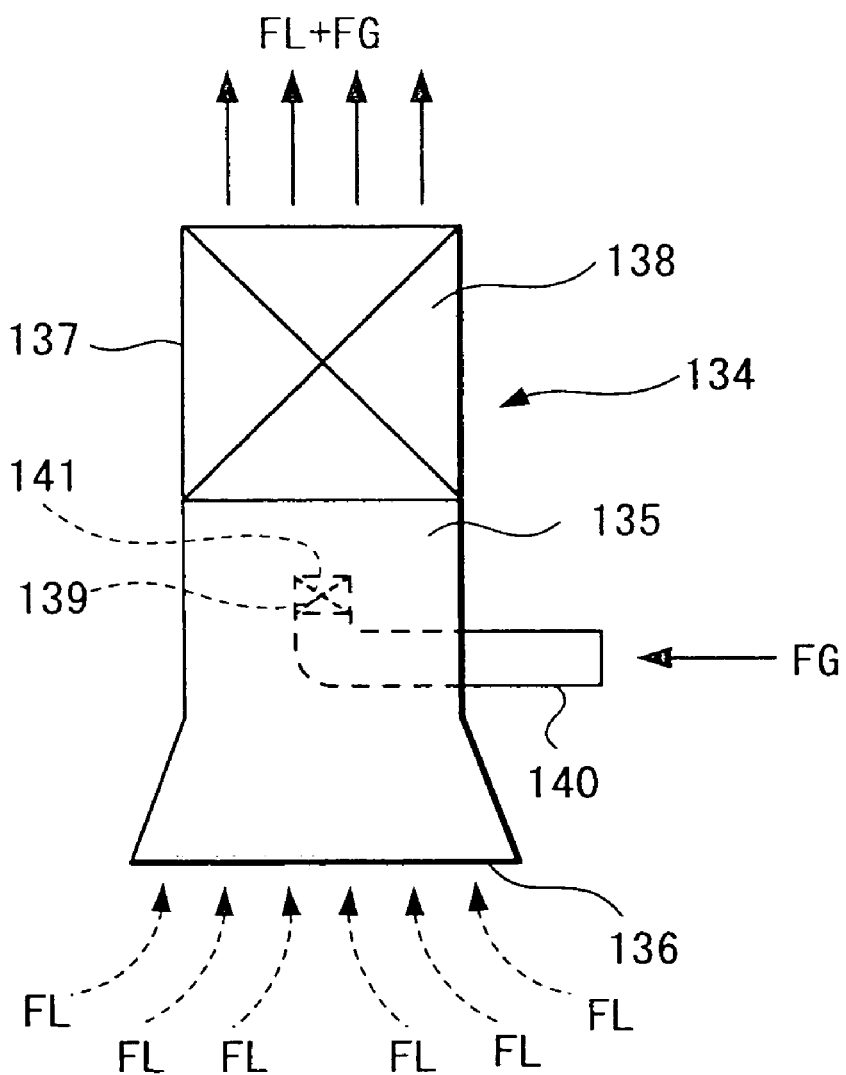
FIG. 20 is a schematic diagram of a diffused gas aeration apparatus according to a fifth embodiment of the present invention.

FIG. 20 is a schematic diagram of a diffused gas aeration apparatus according to a fifth embodiment of the present invention. A diffused gas aeration apparatus 134 includes: a cylindrical passage tube 137 in which a space portion 135 and a liquid-introducing portion 136 are disposed in the lower part thereof, a static mixer 138, and a cylindrical pneumatic dispatch tube 140 which is disposed in the space portion 135 and which has a gas blowoff portion 139. The pneumatic dispatch tube 140 penetrates a side surface of the passage tube 137 to be provided in the space portion 135. The lower part of the cylindrical passage tube 137 is cone-shaped, and the opening area of the liquid-introducing portion 136 is made larger than that of the upper part of the passage tube 137. Thus, the amount of liquid (FL) flowing in is improved. A static mixer 141 formed of a plurality of right twisted spiral blades is disposed in the gas blowoff portion 139. Since gas-liquid contact effect between gas (FG) and liquid (FL) is similar to the above-described FIG. 8, explanation thereof is omitted.

The invention claimed is:
1. An aeration apparatus comprising:
a cylindrical passage tube including an inner surface, a lower end, an upper end opposite the lower end, and a central axis extending between the upper end and the lower end;
a static mixer positioned in the passage tube adjacent the upper end of the tube and including a plurality of perforated blades extending inward from the inner surface of the passage tube forming inter-blade passages and including an opening along the central axis and between the blades forming a central passage continuously joining the inter-blade passages so fluid flowing through the inter-blade passages and fluid flowing through the central passage interact as these fluids flow past the blades during operation of the apparatus;
a gas blowoff portion positioned adjacent the lower end of said passage tube and connectable to a pneumatic line attached to a gas source for supplying gas upward into said passage tube during operation of the apparatus, the gas blowoff portion being separated from the static mixer by a space; and
a liquid-introducing portion adjacent the lower end of the passage tube by which liquid is introduced into the passage tube so the liquid flows upward in the passage tube during operation of the apparatus;
wherein the gas supplied to the passage tube by way of said gas blowoff portion, and the liquid introduced into said passage tube from the liquid-introducing portion at the lower end of said passage tube during operation of the apparatus come in gas-liquid contact as the gas and liquid flow upward together through said space between the gas blowoff portion and the static mixer of said passage tube and come into additional gas-liquid contact in the static mixer before being discharged from the upper end of said passage tube.

2. An aeration apparatus comprising:
a passage tube including a lower end and an upper end opposite the lower end;
a first static mixer positioned in the passage tube adjacent the upper end of the tube;
a gas blowoff portion positioned adjacent the lower end of said passage tube and including a second static mixer connectable to a pneumatic line attached to a gas source for supplying gas upward into said passage tube during operation of the apparatus, the second static mixer including an inner surface, a plurality of perforated blades extending inward from the inner surface of the second static mixer, a central axis, and an opening along the central axis of the second static mixer between the blades so that some of the gas from the pneumatic line flows around the blades and some of the gas from the pneumatic line flows generally straight upward through said opening during operation of the apparatus, the gas blowoff portion being separated from the first static mixer by a space; and
a liquid-introducing portion adjacent the lower end of the passage tube by which liquid is introduced into the passage tube so the liquid flows upward in the passage tube during operation of the apparatus;
wherein the gas supplied to the passage tube by way of said gas blowoff portion and the liquid introduced into said passage tube from the liquid-introducing portion at the lower end of said passage tube during operation of the apparatus come in gas-liquid contact as the gas and fluid flow upward together through said space between the gas blowoff portion and the first static mixer of said passage tube and come into additional gas-liquid contact in said first static mixer before being discharged from the upper end of said passage tube.

3. An aeration apparatus according to claim 1, wherein the perforations of said blades have diameters of between about 5 mm and about 30 mm.

4. An aeration apparatus according to claim 3, wherein an aperture ratio of the perforations is between about 5% and about 80%.

5. An aeration apparatus according to claim 1, wherein a twist angle (turning angle) of said blades is one of about 15°, 30°, 45°, 60°, 90°, 180° and 270°.

6. An aeration apparatus according to claim 1, wherein a pneumatic dispatch tube penetrates the side surface of said passage tube.

7. An aeration apparatus according to claim 1, wherein the lower portion of said passage tube is larger than the upper portion thereof.

8. An aeration apparatus according to claim 1, wherein said blowoff portion includes a spray nozzle connectable to said pneumatic line having a spiraling conical body through which the gas flows during operation of the apparatus.

9. An aeration apparatus according to claim 1, wherein the static mixer is configured so at least three fluid paths are formed in the static mixer whereby some of the gas and liquid flowing through the mixer flows through said inter-blade passages, some of the gas and liquid flowing through the mixer flows through holes in the perforated blades, and some of the gas and liquid flowing through the mixer flows generally straight through said central passage during operation of the apparatus.

10. An aeration apparatus according to claim 1, wherein the static mixer has a diameter $D_m$ and said blowoff portion is spaced from the static mixer by a distance of between about $0.2 \cdot D_m$ and about $3.0 \cdot D_m$.

11. An aeration apparatus according to claim 1, wherein the passage tube has a diameter $D_t$ and said blowoff portion is spaced from the static mixer by a distance of between about $0.2 \cdot D_t$ and about $3.0 \cdot D_t$.

12. An aeration apparatus according to claim 2, wherein a pneumatic dispatch tube penetrates the side surface of said passage tube.

13. An aeration apparatus according to claim 2, wherein the lower portion of said passage tube is larger than the upper portion thereof.

14. An aeration apparatus according to claim 2, wherein the second static mixer is configured so that at least three fluid paths are formed in the second static mixer whereby some of the gas and liquid flowing through the mixer flows along a surface of the blades, some of the gas and liquid flowing through the second static mixer flows through perforations of the blade, and some of the gas and liquid flowing through the second static mixer flows generally straight through said opening during operation of the apparatus.

15. An aeration apparatus according to claim 2, wherein the first static mixer has a diameter $D_m$ and said blowoff portion is spaced from the first static mixer by a distance of between about $0.2 \cdot D_m$ and about $3.0 \cdot D_m$.

16. An aeration apparatus comprising:
a passage tube including a lower end and an upper end opposite the lower end;
a static mixer positioned in the passage tube adjacent the upper end of the tube including a plurality of blades;
a gas blowoff portion positioned adjacent the lower end of said passage tube, connectable to a pneumatic line attached to a gas source for supplying gas upward into said passage tube during operation of the apparatus, and including a spray nozzle having a spiraling conical body through which the gas flows during operation of the apparatus, the gas blowoff portion being separated from the static mixer by a space; and
a liquid-introducing portion adjacent the lower end of the passage tube by which liquid is introduced into the passage tube so the liquid flows upward through the passage tube during operation of the apparatus;
wherein the gas supplied to the passage tube by way of said gas blowoff portion and the liquid introduced into said passage tube from the liquid-introducing portion at the lower end of said passage tube during operation of the apparatus come in gas-liquid contact as the gas and liquid in said space of the passage tube and come into additional gas-liquid contact in the static mixer before being discharged from the upper end of said passage tube.

17. An aeration apparatus comprising:
a passage tube disposed including a lower end, an upper end opposite the lower end, and a central axis;
a gas/liquid static mixer positioned in the passage tube adjacent the upper end of the tube including a plurality of blades;
a pneumatic line connectable to a gas source extending through the passage tube at the central axis of the passage tube;
a plurality of gas blowoff portions positioned adjacent the lower end of said passage tube and connected to the pneumatic line for supplying gas from the gas source upward into said passage tube during operation of the apparatus; and
a liquid-introducing portion adjacent the lower end of the passage tube by which liquid is introduced into the passage tube so the liquid flows upward in the passage tube during operation of the apparatus;
wherein the gas supplied to the passage tube by way of said gas blowoff portions and the liquid introduced into said passage tube from the liquid-introducing portion at the lower end of said passage tube during operation of the apparatus come in gas-liquid contact as the gas and liquid flow upward through a space of the passage tube and come into additional gas-liquid contact in the static mixer before being discharged from the upper end of said passage tube; and
wherein each gas blowoff portion of the plurality of gas blowoff portions includes a gas static mixer comprising a plurality of blades for mixing only said gas as the gas flows through the gas static mixer.

18. An aeration apparatus according to claim 17, wherein the blades of the gas static mixers include multiple perforations.

* * * * *